Jan. 11, 1955  B. E. BAILEY  2,699,045
METHOD OF MANUFACTURING ICE
Filed April 28, 1950  10 Sheets-Sheet 1

INVENTOR Bradford E. Bailey

Jan. 11, 1955 — B. E. BAILEY — 2,699,045
METHOD OF MANUFACTURING ICE
Filed April 28, 1950 — 10 Sheets-Sheet 2

Bradford E. Bailey INVENTOR.

Jan. 11, 1955   B. E. BAILEY   2,699,045
METHOD OF MANUFACTURING ICE
Filed April 28, 1950   10 Sheets-Sheet 4

*Bradford E. Bailey* INVENTOR.

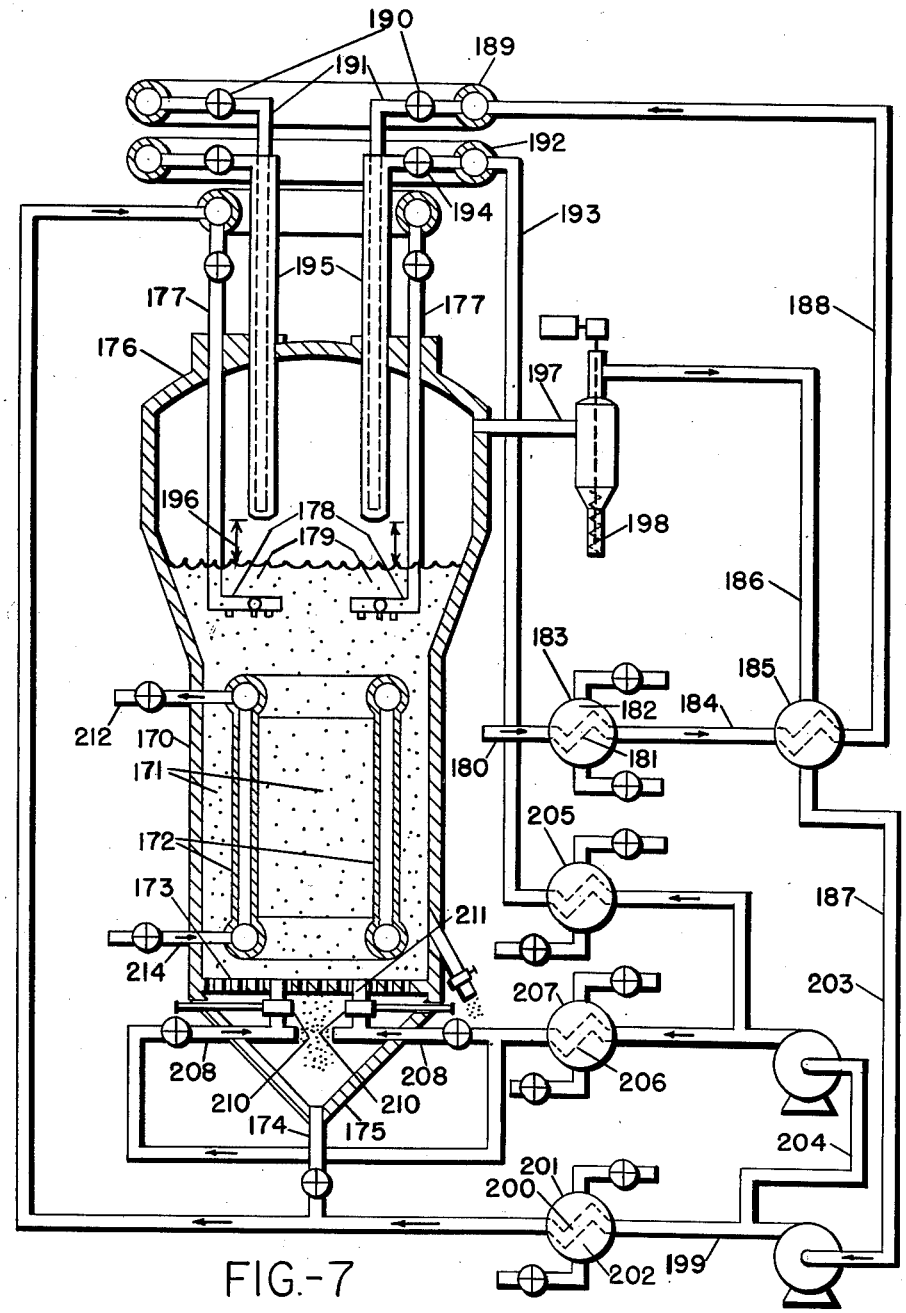

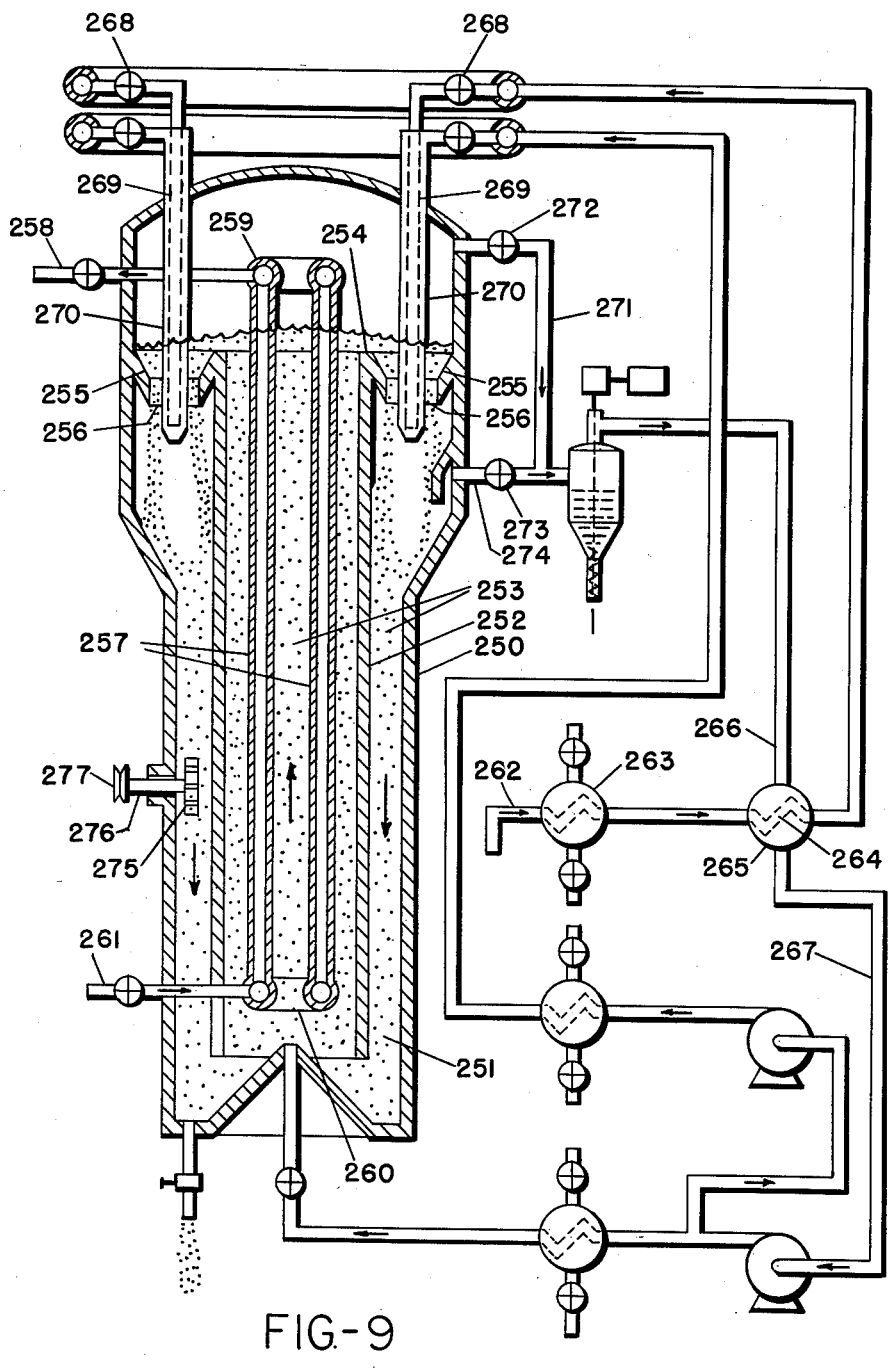

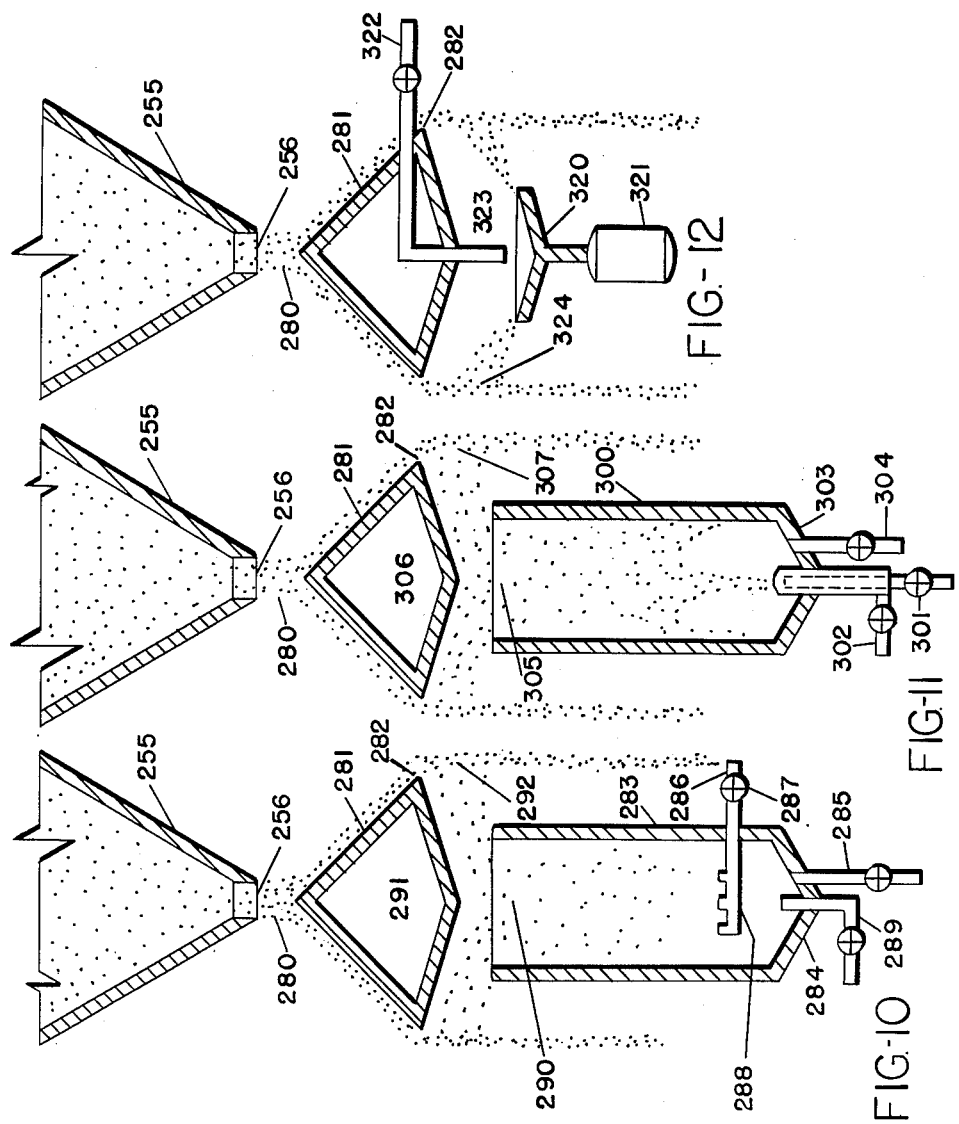

Jan. 11, 1955     B. E. BAILEY     2,699,045
METHOD OF MANUFACTURING ICE
Filed April 28, 1950

Bradford E. Bailey
INVENTOR 2,699,045

METHOD OF MANUFACTURING ICE

Bradford E. Bailey, Elizabeth, N. J.

Application April 28, 1950, Serial No. 158,672

11 Claims. (Cl. 62—172)

The present invention relates to the production of ice. It is more particularly concerned with the production of ice in granular form.

In accordance with the present invention, granular ice, maintained in a chamber at a temperature below the melting point of ice, is contacted with water in the form of mist. The temperatures, quantities, and particle sizes of the ice granules are controlled in the proper relationships to the temperatures, quantities, and particle sizes of the water mist. Also suitable means for bringing about contact between the ice granules and the water mist are employed. In this manner, the ice granules are maintained below a temperatuhe at which they would melt and congeal. Small ice granules are caused to increase in size by contact with the mist and are withdrawn from the chamber as product; meanwhile, additional small ice granules are provided by freezing of water mist particles or by attrition of larger granules.

In the prior art will be found many different methods of producing ice from water, and in the future many different methods will probably continue to be used. The reason for this is that different usages for the ice place different emphasis on the various factors involved in producing ice. For example, in the home-type electric refrigerator, small transparent ice cubes for table use are produced in small pans. Here convenience, shape, and transparency are of far more importance than cost. At the other exteme is the manufacture of ice in large quantities for preserving meat, fruit, and vegetables during transportation. Here the total cost covering equipment, power, and labor is of prime importance and transparency of little importance. For this usage blocks of ice, manufactured by the can-ice method, have been used extensively. Can-ice amounted to 85% of the 47 million tons of ice manufactured in the United States in 1947 [1] and additional large capacity plants are being installed.

Since the can-ice method continues to be important, and since my invention is also adapted to making large quantities of ice at low cost, I have enlarged on the description of the can-ice method and its disadvantages. The main disadvantage of the can-ice method is inherent to its method of manufacture and cannot be avoided, as described in the following paragraphs. In the can-ice method, cans are filled with water and immersed in a tank containing cold brine. The temperature of the water decreases rapidly to near the freezing point of water due to thermal currents set up inside the can or due to air agitation used when transparent ice is desired. Ice then begins to form on the inside surface of the can and increases in thickness. Since the ice is being deposited on the inside surface of the ice already formed, the latent heat of crystallization must be conducted through the ice already formed.

The consequence of having to remove the heat of crystallization through the ice layer already deposited, as described above, is that ice is formed at a progressively lower rate as the thickness increases, and prolonged periods are required in the production of normal size blocks of ice. In this regard, published information [2] on plant experience, shows that 37.8 hours is required to produce a block of ice 11″ x 22″ x 43.5″, weighing 320 lbs., based on a brine temperature of 12° F. and a velocity of brine around the tank of 30 ft./min. It is also pointed out that freezing time is not affected greatly by the initial temperature of the water charged to the cans, since the water cools rapidly to near freezing temperature. Based on this data, the heat removal rate amounts to only 3 to 4 B. t. u./hr./sq. ft. of can surface area.

The low heat removal rate (heat density) determined above is due largely to the temperature drop across the ice layer. In a typical can-ice installation with the ammonia compressor evaporator temperature at 6° F. and the brine entering the freezing tank at 12° F., a breakdown of the overall temperature difference of 26° F. (32° F. minus 6° F.) is given in Table 1 below. It is seen that over the freezing period, an average of 18° F. or 70% of the total temperature differential is due to the ice layer.

TABLE 1

Breakdown of average temperature differential between the water inside the can at 32° F. and the ammonia evaporator at 6° F. in a typical can-ice plant Location of the temperature differential: Amount of differential, ° F.
(1) Across the film of boiling refrigenant (ammonia) on the outside surfaces of the cooler tubes _____ 2
(2) Across the film of brine on the inside surfaces of the tubes in the brine cooler_____ 4
(3) Between brine entering the freezing tank and the brine leaving_____ 1
(4) Across the film of brine on the outside surface of the ice cans_____ 1
(5) Across the layer of ice deposited inside the can (average)_____ 18

Total _____ 26

Other commercial methods of manufacturing ice more recently developed have been principally concerned with schemes for reducing the thickness of ice through which heat must be conducted. For example, in the Flakice method, ice is frozen continuously on the outside surface of a rotating cylinder which is partially immersed in the water to be frozen. The cylinder is cooled on the inside and the ribbon of ice about ⅛ inch thick which is formed on the outside surface of the cylinder is cracked off mechanically. Another scheme is the Tube-ice method, which alternately freezes rods of ice about 2 x 2 inches in cross-section inside of tubes; releases the rods of ice by thawing; and drops the rods through cutting saws. Another scheme, called the Pakice method, involves freezing a layer of ice on the inside surface of a cylinder which is refrigerated on the outside. The ice is scraped off and the slush is compressed into the desired shapes and sizes of water-free ice.

While the Flakice, Pakice, and Tube-ice methods have reduced the thicknesses of the ice layers, moving parts are required to make or remove the ice or else cyclic type operation is necessary. As a result, these machines are usually built with capacities around 1 to 10 tons per day and sometimes around 50 to 100 tons per day. For capacities of around 100 to 1000 tons per day, many such units would be required.

A process in which ice is produced in the form of snow is described by Rollman in U. S. 2,475,255. This ice is produced as a byproduct when air containing water vapor is dried by contacting the air with chilled granular solids. It is an object of Rollman's patent not to retain this snow in the mass of chilled solids but to preferentially entrain the snow from the solids. This snow is separated from the dried air and used to precool the incoming wet air. Furthermore, in Rollman's patent, approximately 1230 B. t. u. must be extracted to convert 1 lb. of water vapor at 60° F. to ice, because the latent heat of 1088 B. t. u./lb. must be removed in addition to the 144 heat of crystallization. In addition, an enormous volume of air would have to be compressed and cooled since the amount of water vapor which can be absorbed by a given volume of air is low. It is obvious that Rollman's air drying process could never be important as a commercial method of producing inexpensive ice.

In my invention, the layer of ice on the metal surface

[1] Ice and Refrigeration, August 1949, page 34.
[2] The Refrigeration Data Book, Applications Volume, second edition, 1946, page 433.

through which refrigeration is applied has been reduced to the minimum by eliminating it altogether through the use of novel and practical means. It is evident from the description of the prior art that this is the ultimate goal toward which previous inventors have strived in their efforts to develop methods for producing cheaper ice.

The main object of my invention is to provide a method for producing ice in large quantities at a lower investment and operating costs than heretofore possible, so far as I am aware. A specific object of my invention is to produce ice directly in the form of granules which can be pneumatically conveyed by hoses into railroad cars at various locations and packed closely around irregular objects. A further object of my invention is to produce ice granules with rounded surfaces which will not damage the delicate surfaces of fruits and vegetables. It is a still further object of my invention to produce granular ice at a temperature sufficiently below its melting point that it may be stored and transferred by flowing as a liquid without congealing. Other objects will appear from the following description and from the drawings.

For illustrative purposes, the invention will be described with specific reference to the production of ice, in which it is particularly applicable, it being understood from the above disclosure that the invention in its broader phases will have more general application. For example, fruit juices or milk may be quickly frozen into granules. My invention is also of advantage in quick freezing concentrated calcium chloride brine solutions, wherein time for segregation of the calcium chloride is not permitted, and the granules are uniform in composition. Such quick frozen brine is of use where it is desired to cool materials to as low —6° F.

For a fuller understanding of the invention, reference will now be made to the accompanying drawings, wherein:

Figure 7 represents another form of the invention in which water is introduced at the upper portion of a freezing chamber containing a densely fluidized bed of ice granules.

Figure 9 represents another form of the invention which involves the circulation of ice granules between two compartments in a freezing chamber.

Figure 10 is a detail view of one of the cone-shaped pieces located in the upper portion of Figure 9 and covers a modification thereto.

Figure 11 is a detail view of one of the cone-shaped pieces located in the upper portion of Figure 9 and covers a further modification thereto.

Figure 12 is a detailed view of one of the cone-shaped pieces located in the upper portion of Figure 9 and covers still another modification thereto.

Figure 1:
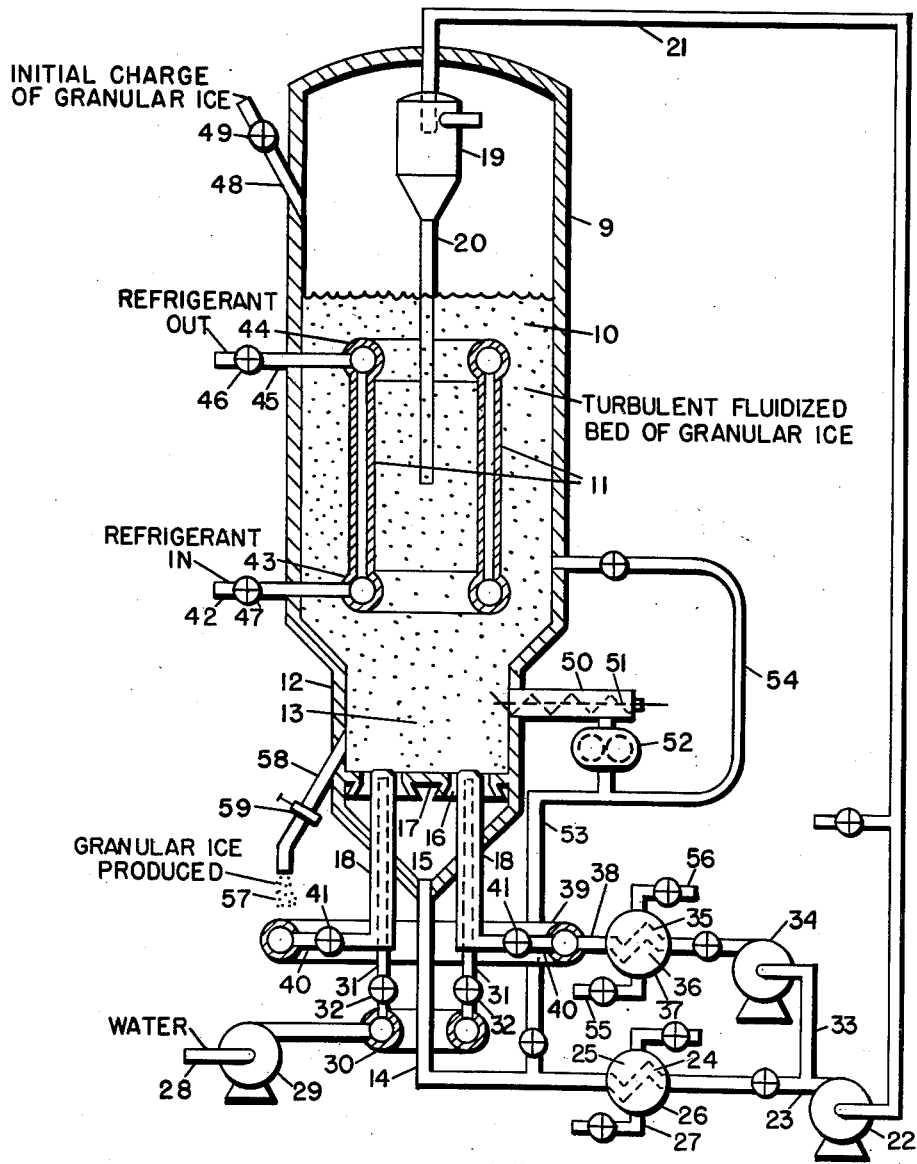
Figure 1 represents one form of the apparatus, suitable for carrying out my invention in whtich water is introduced into the bottom of a freezing chamber containing a densely fluidized bed of ice granules.

Referring to Figure 1, reference character 9 represents the shell of a freezing chamber. This chamber contains a bed of granular ice 10, the granules of which are from 10 to 4,000 microns in diameter. The bed of granular ice is maintained at a temperature below the melting point of ice and the average temperature is maintained preferably below about 25° F. by means of cooling tubes 11 immersed in the said bed of granular ice.

The bed of granular ice is maintained in an ebullient state of fluidization as a boiling liquid by means of a gasiform fluid passing upward through the bed at superficial velocities of from 0.5 to 10 feet per second. Superficial velocities required to produce ebullient fluidization of granular solids of certain densities and sizes are known to the art of fluidized solids technique. The superficial velocity of the gasiform fluid in lower section 12 is preferably maintained equal to or greater than the velocity in the dense bed 10 above by utilizing a smaller diameter in section 12 containing the freezing zone 13.

It is particularly important in this process that a high degree of turbulence and of vertical mixing of the granular ice be secured. This increases temperature uniformity of the granular ice throughout the bed. It also allows more uniform distribution of water mist on the ice granules. It also results in more dispersion between individual granules of ice at the point of contact with water mist, which provides time for the mist deposited on any granule of ice to freeze before the granule contacts another granule. Such high degree of turbulence and mixing is secured by using the highest superficial velocities of gasiform fluid upward through the bed of granular ice that is consistent with the capacity of the cyclone separator to remove entrained granular ice from the gasiform fluid and return it to the dense bed.

Gasiform fluid for fluidizing the ice granules in chamber 9 enters the bottom of chamber 9 through line 14. The gasiform fluid then passes through compartment 15 and distributes itself substantially equally between the annular spaces 16 formed by the holes in the grid-like piece 17 and by tubes 18 projecting through the holes. The introduction of the fluidizing gasiform fluid through annular spaces 16 around each water mist nozzle has four advantages. In the first place, the turbulence of the ice granules in the area surrounding each nozzle is increased. Secondly, the ice granules next to the nozzles are caused to flow away from the end of the nozzle in a direction concurrent with the projection of the water mist, thereby preventing ice granules, which may be wet, from contacting the nozzles. Thirdly, the superficial velocity of the gasiform fluid in the upper portion of the freezing chamber can be maintained suitably low, thereby not increasing entrainment of ice granules from the dense bed. Fourthly, the outside surfaces of tubes 18 are swept by cold gasiform fluid, maintaining this surface below the melting point of ice, thereby avoiding the sticking of ice granules to the said tubes. The velocity through the annular spaces 16 is maintained at approximately 50 to 1,000 feet per second and the ends of tubes 18 may be recessed slightly below the top surface of grid 17 in order to prevent the granular ice from contacting the ends of tubes 18.

After passing upward through the bed of granular ice, the gasiform fluid is passed through cyclone separator 19 whereby the very fine granular ice, entrained from the dense bed, is separated from the gasiform fluid and returned to the bed through tube 20. Ice granules which are separated from the gasiform fluid leaving the top of the chamber are returned to the densely fluidized bed of granular ice in order to provide granular ice of small sizes which is subsequently increased in size by contact with water mist. In some cases it is desirable to use two stages of cyclone separators so that two size grades of granular ice are collected. Then various portions of either or both size grades are recycled as desired. For example, it is desirable to avoid an excessive amount of granular ice less than approximately 30 microns in diameter in order to maintain ebullient fluidization of the bed, and avoid slugging type of fluidization.

The gasiform fluid is discharged from the cyclone separator through line 21 and is compressed by means of compressor 22.

The temperature of the gasiform fluid used for fluidization is increased when the gas is compressed, as illustrated in Table 2 below. It is seen that the temperature rise for propane is less than for air and therefore it would be advantageous to employ a gasiform fluid having a low temperature rise on compression, such as propane, as the fluidizing gasiform fluid.

TABLE 2

| Case | Material | Pressures, p. s. i. g. | | Temps., °F. | | |
| --- | --- | --- | --- | --- | --- | --- |
| | | Inlet | Outlet | Inlet | Outlet | Rise |
| 1a | Air | 0 | 6 | 15 | 85 | 70 |
| 1b | Propane | 0 | 6 | 15 | 40 | 25 |
| 2a | Air | 0 | 2 | 15 | 33 | 18 |
| 2b | Propane | 0 | 2 | 15 | 22 | 7 |

Since it is preferable to have the gasiform fluid entering the freezing chamber through line 14 at a temperature below the melting point of ice, the gasiform fluid is passed through line 23 and tubes 24 surrounded by evaporating refrigerant 25 in cooler 26. It has been found that granular ice will stick to any surface which is at a temperature above the melting point of the ice. Therefore, it is preferable that the fluidizing gasiform fluid, introduced through holes 16 in the bottom of the chamber 9, be maintained at a temperature not exceeding the melting point of ice in order that the temperature of the grid 17 not exceed the melting point of ice.

Another advantage of maintaining the gasiform fluidizing fluid below the melting point of ice is that the amount of water vapor condensing out of the gas as snow is minimized. This is due to the fact that the vapor pressure of water decreases as the temperature is decreased. It has been found that the introduction of such snow into a densely fluidized bed of ice granules, causes agglomeration and slugging and is therefore very detrimental to securing good fluidizzation. The changes in water content of air saturated with water with changes in temperature are shown below in Table 3. For example, it is shown that the water content per cubic foot at 100° F. is 17 times the content at 20° and 129 times the content at −20° F.

TABLE 3

| Temperature, °F. | Water Vapor Pressure, Inches of Mercury, Absolute | Water Content, Lbs. water per 100 cubic feet of Wet Air at Temperature shown and 14.7 p. s. i. a. |
| --- | --- | --- |
| −40 | .0039 | 0.00077 |
| −30 | .0071 | 0.00136 |
| −20 | .0126 | 0.00236 |
| −10 | .0220 | 0.00404 |
| 0 | .0377 | 0.00676 |
| 10 | .0629 | 0.0111 |
| 20 | .103 | 0.0178 |
| 30 | .165 | 0.290 |
| 40 | .248 | 0.0412 |
| 50 | .363 | 0.0595 |
| 60 | .522 | 0.0845 |
| 70 | .739 | 0.118 |
| 80 | 1.032 | 0.163 |
| 90 | 1.422 | 0.224 |
| 100 | 1.933 | 0.304 |
| 120 | 3.44 | 0.497 |

The temperature of the gasiform fluid entering line 14 is controlled by controlling the pressure of the evaporating refrigerant 25. Vaporizing refrigerant enters through line 27.

Water enters the system through line 28 and its pressure is increased to 10 to 700 p. s. i. g. by means of pump 29. The water then enters ring-like header 30 from which it leaves through one or more tubes 31. The water rate is controlled by valves 32.

The water is atomized by being forced through restrictions in the ends of tubes 18 with gasiform fluid. The average size of the drops and the drop size distribution of the water mist which contacts the ice granules is very important to the operation of my invention. Therefore, considerable care must be exercised in selecting the most advantageous means for atomizing the water.

It is known[3] that the average size of the drops is decreased by increasing the atomizing or disrupting force applied to the liquid. In this regard, for pressure atomizing nozzles, the greater the pressure employed, the smaller the size of the drops. Atomization by means of a gas produces smaller drops, in general, than does pressure atomization because more power is expended on the liquid with gas atomization. It also holds that the greater the gas pressure, the smaller the size of the drops. In the case of pressure nozzles, it is also known that drop size is inversely proportional to the liquid surface tension and to the density.

The uniformity in drop size, it is known[3] is increased in pressure atomizing nozzles by utilizing a large number of small nozzles in preference to a few nozzles of large capacity. However, in the case of gas atomizing nozzles, the nozzle size is not so important. Nozzles producing "hollow-cone" spray patterns usually yield a somewhat smaller range of drop size than the nozzles producing "solid-cone" sprays. It is also known that rotating discs produce more uniform drop sizes.

Typical drop size distributions produced by a hollow-cone pressure-atomizing nozzle are given below in Table 4 for two different pressures and two nozzle sizes.[3] Furthermore, if liquids of different physical properties are sprayed, the same size distributions will be obtained but at different pressures.

TABLE 4

Size distributions produced by hollow cone-type pressure atomizing nozzles

| Diam., Microns* | 0.063 Inch Nozzle | | | | 0.128 Inch Nozzle | |
| --- | --- | --- | --- | --- | --- | --- |
| | 100 P. s. i. g. | | 200 P. s. i. g. | | 200 P. s. i. g. | |
| | Number, Percent | Volume, Percent | Number, Percent | Volume, Percent | Number, Percent | Volume, Percent |
| 10 | 57.60 | 0.8 | 63.24 | 0.2 | 38.5 | .001 |
| 25 | 20.20 | 4.4 | 21.64 | 0.9 | 19.3 | .009 |
| 50 | 13.00 | 2.2 | 9.65 | 3.1 | 17.4 | .720 |
| 100 | 4.30 | 6.0 | 2.60 | 6.7 | 10.4 | 3.47 |
| 150 | 2.23 | 10.5 | 1.30 | 11.7 | 5.9 | 6.50 |
| 200 | 1.66 | 18.4 | 1.01 | 21.0 | 4.25 | 11.30 |
| 300 | .65 | 24.3 | .41 | 30.3 | 2.32 | 20.9 |
| 400 | .29 | 25.6 | .15 | 26.1 | 1.16 | 24.8 |
| 500 | .07 | 12.5 | | | 0.77 | 32.3 |
| 600 | | | | | | |
| | 100.00 | 100.0 | 100.00 | 100.0 | 100.00 | 100.000 |
| Average Drop | 31.8 | | 24.9 | | 61.5 | |

Typical size distributions produced by a gas atomizing nozzle having a pressure drop of 15 p. s. i.

| Nominal Drop, Diam., Microns* | Number, percent | Weight, percent |
| --- | --- | --- |
| 2 | 40.8 | .32 |
| 5 | 35.4 | 4.36 |
| 10 | 17.21 | 17.00 |
| 15 | 4.17 | 13.79 |
| 20 | 1.22 | 9.05 |
| 25 | .52 | 7.95 |
| 30 | .22 | 5.98 |
| 35 | .18 | 7.60 |
| 40 | .111 | 7.10 |
| 45 | .067 | 6.05 |
| 50 | .044 | 5.50 |
| 60 | .036 | 7.50 |
| 70 | .022 | 7.80 |
| 5.6 average | 100.000 | 100.00 |

*1 micron = $\frac{1}{25,000}$ inch.

Atomization of water into fine drops is secured in a modification by dissolving a gasiform fluid in the water by elevated pressures and spraying this mixture out through nozzles. A suitable gasiform fluid would be one which requires elevated pressures to cause it to dissolve in water at temperatures near the freezing point of water and which will vaporize completely when the pressure is released. One such gasiform fluid is carbon dioxide. Since dissolved carbon dioxide is molecularly dispersed within the water, the water is violently ruptured into fine drops on pressure release. The expansion of the carbon dioxide has two other advantages; the first that the vaporization of the carbon dioxide cools the water during its vaporization; the second that the freezing point of the water is lowered, enabling the water to be pre-

[3] Chemical Engineers Handbook, by J. H. Perry, 2nd edition, pages 1990-3.

cooled below the freezing point of water. Due to this second point, the surface temperature of the nozzle may be decreased below the melting point of ice, eliminating sticking of ice particles to the outside surface of the nozzle.

Atomization of the water by means of very high pressures is practiced in a further modification. High pressures of 2,000 to 20,000 p. s. i. g. give a high degree of atomization and also lower the freezing point of water as shown in Table 5 below. The lower freezing points have the advantage that freezing of water on the inside surface of the spray pipes and nozzles could be practically eliminated by use of sufficiently high pressures. Also, freezing of ice particles to the outside surface of the spray nozzles would be practically eliminated.

TABLE 5

*Effect of pressure on the freezing point of water*

| Pressure, P. s. i. g. | Freezing Point of Water ° F.[4] |
|---|---|
| 0 | 32 |
| 4,770 | 27.5 |
| 12,600 | 18.5 |
| 16,400 | 14 |

[4] Chemical and Rubber Handbook, 24th edition, page 1739.

The water mist leaving tubes 18 contacts chilled, granular ice in freezing zone 13 and is frozen, causing the ice granules to grow in size. Substantially, all of the mist is frozen by contact with the chilled granular ice; however, a portion of the smallest mist particles may be frozen by contact with cold gas only. These fine ice granules form nuclei which increase in size by contact with additional mist.

The introduction of the water mist below the surface of the bed is advantageous for the reason that the water mist is totally surrounded by ice granules and therefore must come into intimate contact with the ice granules. Consequently, contact of water mist on the walls of the chamber is practically eliminated. Also, it is easier to retain small ice granules formed in the lower part of the dense bed than in the upper part due to the filtering action of a bed of fluidized solids. Another advantage is that the ice granules are in a state of ebullient or high turbulence, which provides more even distribution of the water mist on the surfaces of different ice granules and over the surface of any individual ice granules. Another advantage is that the distance that the water mist must travel before it strikes the ice granules is decreased, which decreases the amount of mist frozen by contact with the fluidizing gasiform fluid only.

I have found that the water inside the tubes 31 must be maintained at a temperature above its freezing point and the outside surface of the nozzle must be below the melting point of ice. One method of accomplishing this is to place around tubes 31 a jacket carrying a fluid maintained above the freezing point of water, meanwhile maintaining the temperature of gasiform fluid flowing in the annular space between tubes 18 and tubes 31 below the melting temperature of the ice. This low gasiform fluid temperature minimizes the quantity of water that is evaporated into the atomizing gas, and, as consequence the quantity of snow formed from condensing moisture is minimized. An alternative method is to employ electrical resistance heaters around tubes 31 and inside tubes 18.

Gasiform fluid for atomizing the water is taken from the discharge of compressor 22, passed through line 33, further compressed by compressor 34, and cooled by passage through tubes 35 which are surrounded by vaporizing ammonia 36 in exchanger 37. The gasiform fluid is then passed through line 38 into ring-like header 39 and through lines 40; regulated as to flow rate by valves 41; passed through tubes 18; and then forced out through the nozzles at the ends of tubes 18 along with the water.

The tubes 11, which refrigerate the dense bed of ice granules, contain a vaporizing refrigerant such as ammonia. This ammonia in liquid state enters the bottoms of the tubes 11 through line 42 and ring shaped header 43, is vaporized as it passes upward, and discharges as a vapor through header 44 and line 45. The temperature of the ammonia within tubes 11 is controlled by controlling the vaporizing pressure of the ammonia by means of valve 55. The flow of refrigerant to the tubes 11 is controlled by valve 56 to hold a level of refrigerant in the upper portion of the tubes 11. The vaporization of liquid ammonia in the tubes 11 extracts heat from the ice granules 10. The use of cooling tubes immersed in a densely fluidized bed of ice granules is a very important part of the invention. The cooling tubes remain substantially free of any ice deposit and therefore heat is not required to travel through any appreciable layer of ice. The use of small diameter tubes such as 2" O. D. makes it possible to concentrate a large amount of cooling surface inside a chamber with only a small portion of the volume of the chamber occupied by the tubes.

I have found that the use of cooling tubes and a densely fluidized bed of granular ice is an extremely effective means for extracting heat from water being frozen. This arrangement avoids a thick layer of ice on the freezing surface which greatly retards heat transfer as when making black ice. It also avoids even a thin layer of ice which is deposited in some ice making processes and which requires expensive mechanical action to remove the thin layer.

In my invention, high heat transfer coefficients of up to 100 B. t. u./hr./sq. ft. of external tube surface are secured. In this regard, it is preferable to maintain the ice granules in a size range of about 25 to 150 microns. Ice granules as small as 10 to 25 microns in size tend to agglomerate and cause slugging and are more easily cemented together by water mist. On the other hand, ice granules larger than 150 microns do not give as high heat transfer coefficients.

A refrigerating medium inside tubes 11 such as cold brine may also be employed but the use of the vaporizing refrigerant is preferable. Power requirements for the refrigerating compressor are lower when evaporating the ammonia directly in the cooling tubes 11 than when brine is employed as an intermediate heat transfer medium. This is due to the fact that the ammonia must be evaporated at a lower temperature and consequently lower pressure when using brine. The effect of evaporating pressure (compressor suction pressure) on the compressor volumetric capacity and power requirements are shown in Table 6 below.

TABLE 6

[Compressor discharge pressure is 185 p. s. i. g. and corresponding condensing temperature for ammonia is 95.5° F. Compressor is single-acting.]

| Suction Temp., ° F. | Suction Press., P. s. i. g. | Brake Horsepower at Compressor | Volumetric Displacement, Cu. Ft. per Minute |
|---|---|---|---|
| −17.5 | 5 | 3.54 | 12.5 |
| −8.5 | 10 | 3.03 | 9.71 |
| +5.7 | 20 | 2.35 | 6.68 |
| +11.5 | 25 | 2.11 | 5.76 |

The large decrease in power requirements and volumetric displacement with an increase in suction temperature is very evident from Table 6. As a result, it is obvious that my invention, which is designed to operate at high suction temperatures, is most advantageous and results in reduced refrigeration installation and operating costs.

The use of the vaporizing refrigerant directly in the tubes is also preferable for the reason that the bed of fluidized solids is at substantially a uniform temperature top to bottom and is therefore adaptable for being cooled by tubes which are at substantially the same temperature at the top and bottom.

It is desirable to supply refrigeration continuously to the bed of fluidized ice granules in order that the advantages of smooth closely controlled operation be secured. It would, of course, be possible to supply refrigeration and/or water mist periodically or alternately; however, this would reduce the ice-making capacity of the equipment and would require very elaborate controls.

In the starting-up operation, cold gasiform fluid, such as air, is circulated through the freezing chamber 9. Air entering at line 14 and leaving at line 21, is compressed by compressor 22, and cooled by cooler 26. An initial charge of powdered ice of suitable particle size and in a chilled condition is introduced through line 48 and valve 49.

Ice granules from the bottom of the freezing chamber 9 are withdrawn through line 50, fitted with a screw conveyor 51, and are reduced in size by means of crusher 52. Cold air from line 53 entrains the crushed ice particles upward through line 54 back into the freezing chamber 9. It may be desirable to crush some of the largest size ice granules settling to the bottom of the freezing chamber in order that they may be more easily fluidized, that the granules may be made more uniform in size, or that small ice nucleuses may be formed which can be increased in size by contact with water mist.

Refrigerant passes through line 55 to cooler 37, and a portion through line 27 to cooler 26. Vaporized refrigerant leaves cooler 37 through line 56.

Product granular ice 57 is withdrawn through line 58 and valve 59.

The inside surfaces of all equipment containing ice are maintained at temperatures below the melting point of ice. This is done by the application of insulation to the outside surfaces of those parts of the equipment which is sufficiently cooled from the inside, as the main freezing chamber 9 surrounding bed 10. In regard to those parts where the ice contents are substantially motionless with respect to the surface, or where the surface is large in proportion to the cooling capacity of the contents, maintaining metal temperatures below the melting point of ice is more difficult. In these cases, it will be preferable to cool the outside surfaces by means of a jacket or pipe coil containing a refrigerating liquid or gasiform fluid.

Figure 2:
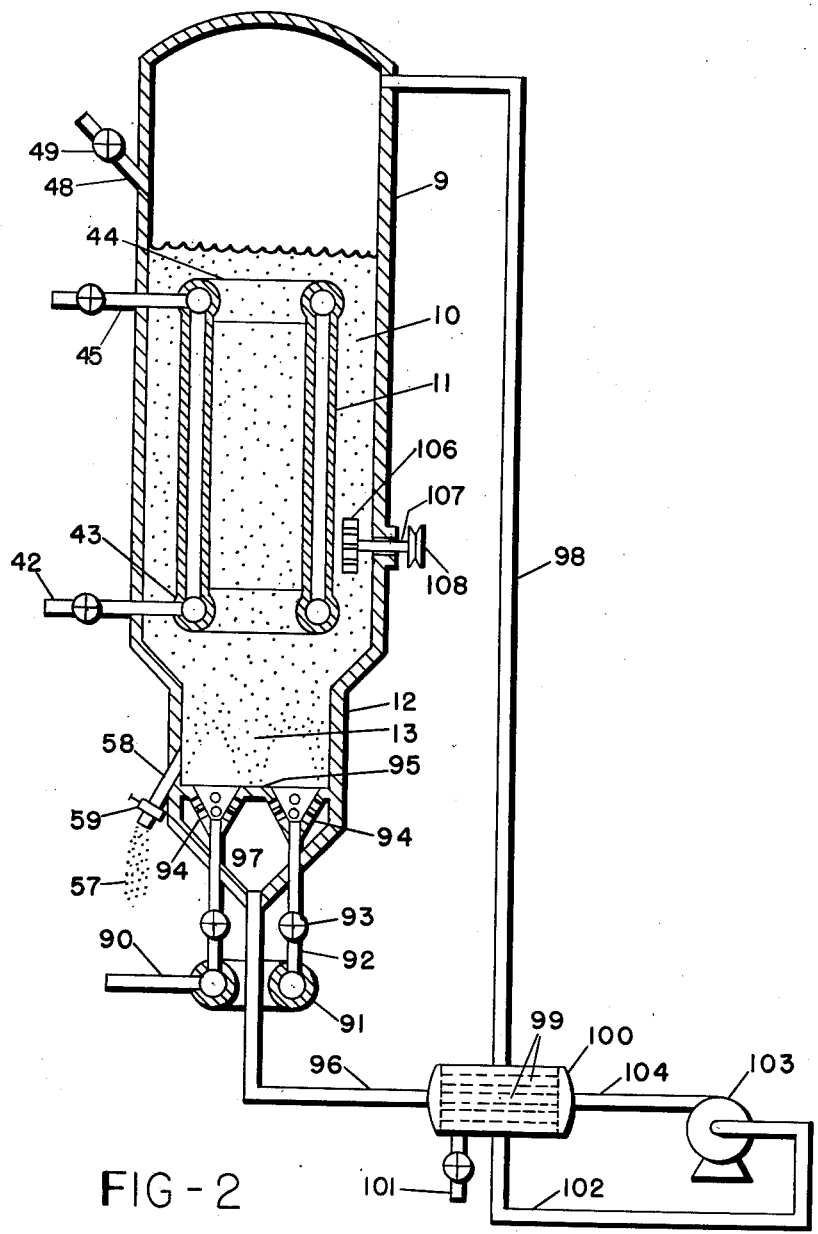
Figure 2 represents a modification to Figure 1.

Figure 2 shows a modification of Figure 1 concerning the method of atomizing the water and recycling the fluidizing gasiform fluid. The water is introduced through line 90, header 91, and lines 92 at a rate controlled by valves 93. The water then enters into cone-shaped pieces 94, perforated with small holes, and connected into grid 95. The recycled fluidizing gasiform fluid enters through line 96, through compartment 97, and through the perforations in cones 94. The gasiform fluid atomizes the water in piece 94 and fluidizes the granular ice 13 and 10 in freezing chamber 9.

A maximum volume of gasiform fluid available is thus utilized for atomizing the water by this modification. Atomization of the water into smaller drops is therefore secured, since increases in the volume of atomizing gasiform fluid are known to improve atomization. This modification is also advantageous for the reason that it provides a high degree of turbulence of the granular ice in the zones of contact between the granular ice and the water mist, where turbulence is of most importance.

In a further modification covered by Figure 2, fluidizing gasiform fluid from the top of the freezing chamber 9 and line 98 is passed over the outsides of tubes 99 in heat exchanger 100. Snow and very fine granular ice, entrained from the dense bed of granular ice, are melted, and the water produced saturates the gasiform fluid with the excess water draining out line 101. The gas, heated to slightly above the melting point of ice in the exchanger 100, passes through line 102, is raised in pressure by compressor 103, passes through line 104, and is cooled by passage through tubes 99 of exchanger 100. The gasiform fluid leaves the exchanger through line 96, enters compartment 97, and passes through cones 94 as previously mentioned.

The temperature of the gasiform fluid entering cones 94 is maintained above but near the freezing temperature of the water by proper control of the quantity of ice entrained from the dense bed 11 by controlling the velocity of the gasiform fluid up through the bed. Maintaining the said temperature of the water saturated gasiform fluid entering cones 94 reduces the amount of water vapor contained in the gasiform fluid far under the water content which would exist if the temperature correspond to the uncooled discharge temperature at the compressor in line 104. It is also important that the temperature of gasiform entering cones 94 not be lower than stated in order to avoid freezing of water in cones 94.

The modifications described above enable the one compressor 103 and cooler 100 in Figure 2 to be used in place of two compressors 22 and 33 and two exchangers 26 and 36 in Figure 1 by having one stream of gasiform fluid entering the freezing chamber instead of two.

Figure 3:
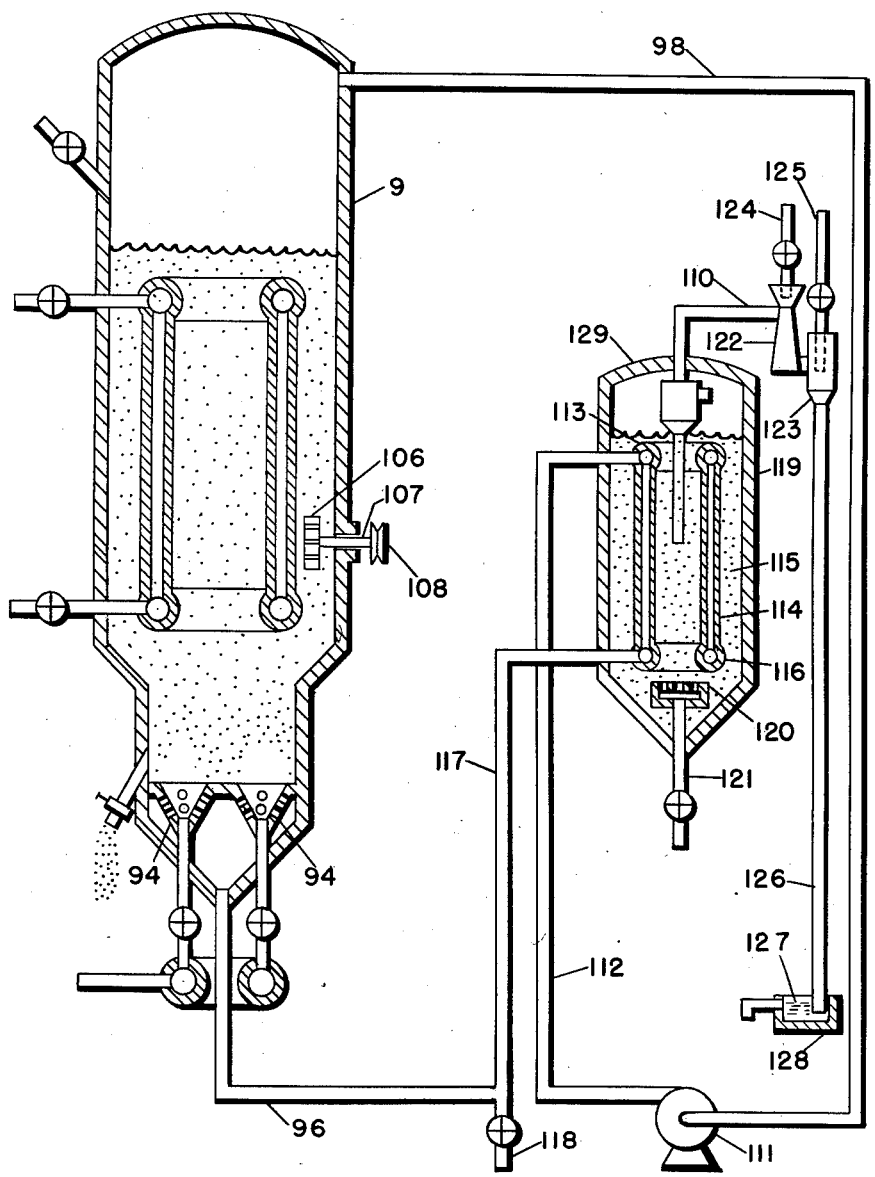
Figure 3 represents a further modification of Figure 1.

Figure 3 is a further modification of Figure 1 and an alternate arrangement to Figure 2 with respect to the method of cooling the recycle fluidizing gasiform fluid. The fluidizing gasiform fluid passes from the top of the freezing chamber 9 through line 98 and to the compressor 111. Any entrained snow or fine granular ice are melted and serve to cool the gasiform fluid leaving the compressor discharge through line 112. The high pressure gasiform fluid enters header 113, passes downward through the bank of tubes 114 immersed in a dense bed of cooled fluidized solids 115, thereby cooling the gasiform fluid. The gasiform fluid is passed out through header 116, outlet line 117, and into the bottom of freezing chamber 9 through line 96. Water from melted snow or ice or condensation from cooling is drained out line 118.

The dense bed of finely divided solids 115 such as sand or clay, contained in vessel 119, is cooled due to the vaporization of water as it is discharged from the perforations in the grid 120 at the end of tube 121. The water vaporizes due to the subatmospheric pressure effected by means of steam jet vacuum pump 122 on water vapor passing out line 110 followed by direct contact type condenser 123. Steam enters the jet pump through line 124 and cooling water enters the condenser through line 125. The long downpipe 126 filled with water is sealed at the bottom by means of the water level 127 in tank 128.

The bed of solids 115 is fluidized by the water vapor produced and entrained solids are removed by cyclone separator 129 and returned to the bed. The temperature of the fluidized solids is controlled at about 35° to 40° F. by maintaining the pressure in the vessel 119 at about 5 to 6 mm. of mercury absolute. Such temperatures are often economically feasible with steam jet refrigeration.

In this modification, as in Figure 2, the gasiform fluid entering cones 94 is cooled close to but not below the freezing temperature of the water, since water has a very low vapor pressure at its freezing point. The use of water vaporizing to cool the recycle gasiform fluid is particularly applicable because a large amount of vapor is formed per pound of water due to the low molecular weight of water.

Figure 4:
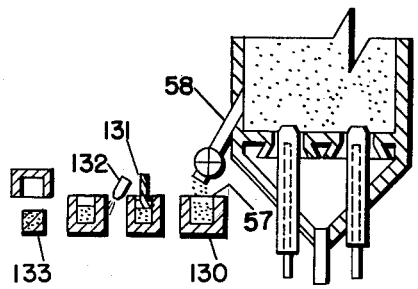
Figure 4 represents the bottom portion of Figure 1 and a modification thereto.

Figure 4 shows the lower part of Figure 1 and an added feature in regard to the product granular ice. The product granular ice 81 leaving line 79 is dumped into box 130 and then compressed by means of piston 131. The boxes are then warmed by water jets 132 and the block of ice 133 discharged. The ice granules may either be pressed into a hard dense block or into a loose block which is easily fractured into small pieces of granules.

Granular ice produced in this process is particularly adaptable to pressing into blocks because of the small size and uniform shape of the individual granules of ice. Thus it is easy to flow the granular ice so that it fills a box. In pressing the ice, the pressure is distributed substantially uniformly throughout the mass of ice granules, resulting in uniform sticking together of the granules.

The small size of the ice granules is also particularly adaptable to pressing, since in order for two granules to freeze together due to pressure, the ice at the surface of the particles must first melt, and in order for the ice to melt, heat must flow from the inside of the granule (lowering the inside temperature) to the outside surface of the granule where ice is melted. The smaller the piece of ice the more rapid is this heat flow.

Figure 5:
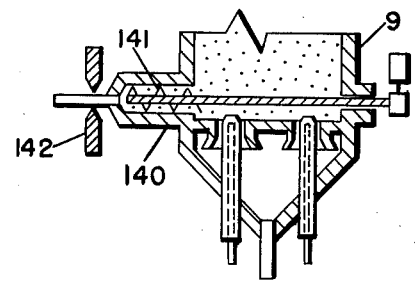
Figure 5 represents the bottom portion of Figure 1 and a further modification thereto.

Figure 5 shows the lower part of Figure 1 and a modification thereto. The product ice is discharged from the bottom of the freezing chamber 9 through line 140 by means of a screw 141. The screw compacts and extrudes the ice into a cylindrically or rectangularly shaped cross-section. The extruded piece is chopped off by cutters 142 into desired lengths. The particular adaptability for granular ice for pressing into larger shapes was described under Figure 4.

It is pointed out that the screw conveyor is located in order to discharge granular ice from the bottom of the chamber 9 where the largest size granules will tend to accumulate.

The forced discharge of the product ice is advantageous because it is a positive method and avoids any bridging difficulties in withdrawing granular ice by means of a line and slide valve.

Figure 6:
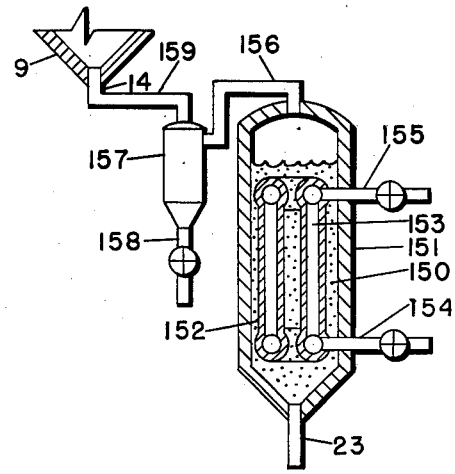
Figure 6 represents the bottom of Figure 1 and a modification in regard to the means for cooling the recycle gasiform fluid.

Figure 6 shows the bottom of chamber 9 of Figure 1 and covers a modification in regard to the manner of cooling the recycle gasiform fluid. Gasiform fluid leaving in line 23 passes through the bed of fluidized solids 150 contained in vessel 151. The fluidized solids are chilled by tubes 152 containing coolant 153 which enters at line 154 and leaves at line 155. The said fluidized solids consist of fine granules of sand, clay, or other hard inert material. The cooled gasiform fluid leaves vessel 151 through line 156. Snow formed by the condensation and freezing of water is entrained from the bed, separated from the gasiform fluid by means of cyclone separator 157 and is withdrawn through line 158. The gasiform fluid cooled below the freezing point of ice is then passed through lines 159 and 14 to freezing chamber 9.

In this process the quantity of snow (produced by the condensation of water vapor) introduced with the gasiform fluid entering freezing chamber 9 is greatly reduced. The entrance of such snow into chamber 9 may be entirely avoided by cooling the gasiform fluid in vessel 151, below the temperature of the granular ice contacting the gasiform fluid in the freezing chamber 9.

Fig. 7 represents another form of the invention. Freezing chamber 170 contains dense bed of fluidized granular ice 171, tubes 172 immersed in said bed for cooling said bed, grid 173 at the bottom of chamber 170 for distributing gasiform fluid passing upward through the said bed, inlet line 174 through which the fluidizing gasiform fluid enters the bottom of compartment 175. The upper section 176 of chamber 170 is of larger diameter and has sides sloping into the middle portion of the chamber.

Extending down from the top of section 176 are one or more tubes 177 terminating in spider-like headers 178 which have holes, preferably in the bottom, for injecting additional cold gasiform fluid in order to cause violent agitation in zones 179 above the spider headers 178. The distance that the spider may be immersed is variable.

I have found that very ebullient fluidization is required in zone 179 where the water mist contacts the dense bed of granular ice. Therefore, more gasiform fluid is used per unit area in the zones 179 contacted by the water mist than in the other area around zones 179 and very ebullient fluidization is secured without increasing the average superficial velocity or increasing the overall entrainment of granular solids from the bed.

Water enters the system at line 180, and is precooled by passage through tubes 181 surrounded by refrigerant 182 in cooler 183. The water passes through line 184 and is further cooled by heat exchange with cool gasiform fluid entering cooler 185 at line 186 and leaving by line 187. The temperature of the water at line 188 is lowered to approximately but not below the freezing point of water and is controlled by regulating the amount of cooling in cooler 183 by adjusting the pressure of the refrigerant 182 in cooler 183. The water then enters ring header 189, is controlled in rate by means of valves 190, and passed through tubes 191.

Gasiform fluid to atomize the water enters ring header 192 at line 193; controlled in rate by means of valves 194; passed downward inside tubes 195 and outside tubes 191; and atomizes the water by passage of the two fluids through the restrictions in the end of tubes 195.

The distance 196 between the surface of the dense bed 171 and the end of tubes 195 is variable. It is desired that the said distance 196 be sufficiently small that the water mist particles reach the surface of the dense bed 171 before they are entrained by the gas emerging from the dense bed. It is also desired that distance 196 be sufficiently great that a negligible quantity of chilled solids from the bed are splashed up into contact with the tubes 195.

I have found that it is extremely important to secure uniform distribution of the water mist over the surface of the granular ice, in the zones 179 where the water mist is projected. Spraying the water in a downward direction onto the surface of the dense bed is particularly advantageous because the water mist can be dispersed over a wide horizontal area before it contacts the granular ice. The amount of area uniformly and thoroughly covered by spray is increased by using a spray pattern which is solid rather than hollow on the inside.

In case the velocity of the gasiform fluid emerging from the dense bed of granular ice is high it will be desirable to project the water mist toward the surface of the bed at especially high velocities in order that the water mist will not be entrained in a reverse direction before contact is made with the granular ice. Use of especially high water pressures in the range of 5,000 to 15,000 p. s. i. with pressure atomizing nozzles or the use of gasiform fluid atomizing, with nozzle pressure drops of 100 to 500 p. s. i. are employed to give the high mist velocities desired. It is advantageous to vary the average size of the water drops by varying the pressure used in pressure atomizing or the quantity of gas used in gas atomizing. This is done in order to minimize entrainment of water mist at various velocities of the gasiform fluid flowing upward, countercurrent to the water mist.

In a further modification the distance 196 is made sufficiently great that a portion of the water mist is frozen due to contact with the cold gasiform fluid rising upward through the top portion of the freezing chamber 176. The small size granular ice produced in this manner strikes the surface of the dense bed of granular ice and is retained to some extent in the dense bed, serving as nucleuses for the production of granular ice of larger particle size. The proper velocities for the mist to employ in conjunction with certain superficial velocities of the fluidizing gasiform fluid can be calculated by known relationships.

I have found that particular care must be exercised to prevent the sticking of granular ice to the water nozzle and especially the end of the nozzle. The arrangement of Fig. 7 wherein the water mist nozzles are above and without the dense bed of granular ice greatly decreased the likelihood of granular ice becoming frozen to the nozzle. In the first place only a relatively small amount of granular ice will contact the water nozzle and most of that will have dry surfaces because it will have been passing through the cold gasiform fluid in the open space in the upper part of the chamber thus providing sufficient time for any water coating to freeze. In the second place, contact of the granular ice with the water discharge end of the nozzle, which is above the melting point of ice is largely prevented due to the discharging of the atomizing gasiform fluid from the end of the nozzle. Granular ice traveling toward the end of the nozzle in the disperse phase is easily diverted by the force of this atomizing gasiform fluid.

A modification consists of introducing sufficient atomized water into section 176 that the temperature of the gasiform fluid leaving through line 197 is above the freezing point of water. This modification would eliminate the troublesome snow which tends to cling to equipment containing vapor gasiform fluid. The water is atomized into sufficiently small size drops so that a portion of the drops is entrained out line 197. The temperature of the water so introduced to so raise the temperature of the gasiform fluid would be substantially above the temperature of the freezing point of water. In fact in some instances it is advisable to introduce water in vapor form which condenses into small drops, thus supplying heat of condensation to the gasiform fluid.

Gasiform fluid is discharged from the upper section 176 of chamber 170 through line 197, and entrained fine ice particles are removed in a cyclone separator. A rotating shaft having scraper rods and screw aid in compacting and discharging the ice particles out line 198. A screw is particularly advantageous in extruding granular ice or snow since the heat produced by friction of the screw on the snow or the granular ice causes sufficient melting of the surfaces of the ice granules to help cement them together.

The gasiform fluid substantially free of ice particles passes into line 186 and enters cooler 185 where the low temperature of the gasiform fluid is used to cool the water. The gasiform fluid then passes through line 187 and its pressure is increased by means of a compressor. Then the gasiform fluid flows through line 199 with the major portion of the gas being cooled by passage through tubes 200 of cooler 201 refrigerated by the refrigerant 202.

It is very important that the minimum amount of water vapor be contained in the gasiform fluid in line 187 in order to minimize the deposition of ice on the tubes 200 of the cooler 201. In reducing the water vapor content of the gasiform fluid, it is especially advantageous to remove practically all of the entrained ice from the gasiform fluid before the gasiform fluid is compressed since compression increases the capacity of gasiform fluid to absorb water vapor.

In Fig. 7 the fluidizing gasiform fluid is reduced in temperature to below the freezing point of water as it passes through the bed of granular ice before coming into contact with water mist. This arrangement has two advantages, the first being that the gasiform fluid is not raised in temperature or saturated by water vapor from the water atomizing nozzles prior to its passing upward through the bed of ice granules. Secondly, the small quantity of snow which is formed is entrained immediately after formation out of the chamber and removed from the system.

A minor portion of the recycle gasiform fluid enters compressor 203 through line 204, is cooled by cooler 205, and passed to line 193 and header 192 to be employed in atomizing the water discharge through tubes 191.

A portion of the recycle gasiform fluid from compressor 203 passes through the tubes 206 of cooler 207, passes through lines 208 and entrains granular ice flowing from above grid 173 downward through lines 211 and slide valves 210. The granular ice streams leaving the ends of lines 208 are then impinged against each other head-on to fracture the granules into smaller sizes. The opposing jet grinder is particularly adaptable to reducing the size of the ice granules. In this type of grinder, the time of contact between colliding granules is minimized. As a result there is insufficient time for the ice at the surface of the granular ice to melt, due to pressure, and cause granules to freeze together.

In operations where the velocity of the gasiform fluid upward through the granular ice is sufficient to entrain a substantial quantity of the granular ice from the bed, it will be necessary to supply small ice granules for contacting with the water mist, by fracturing larger ice granules. It is preferable to withdraw granules from the bottom of the freezing chamber since the largest size granules will concentrate to some extent there. It is also preferable to return the fractured ice granules into the bottom portion of the freezing chamber.

Another purpose of the fracturing process is to maintain proper fluidization of the granular ice since the degree of fluidization and turbulence is a function of granule size. Fracturing large ice granules into smaller granules is also required in some operation to maintain the size of the granules sufficiently small that high heat transfer rates between the fluidized granular ice and the cooling tubes immersed in the ice granules are secured.

An advantage of injecting the water onto the top surface of the bed of fluidized granular ice rather than into the bottom section (as in Fig. 1) is that any snow formed is more readily entrained from the bed.

Figure 8:
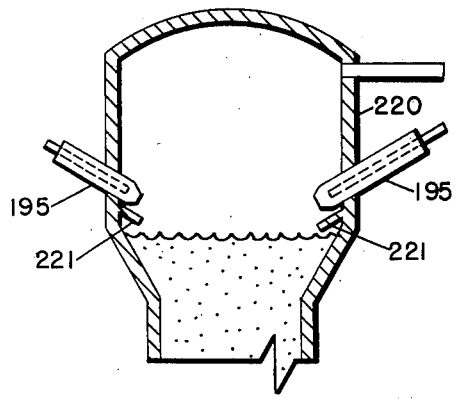
Figure 8 represents the upper portion of Figure 7 and a modification thereto.

Fig. 8 shows the upper portion of Fig. 7 and a modification thereto in that the water nozzles 195 enter the sides of the chamber 220 near the top and at an angle to the surface. This angle will be preferably between 10° to 45° with horizontal. Small baffles 221 are located under the sprays.

Introducing the water at an angle in this manner serves to distribute the water mist over a wide area at the surface of the dense bed. It also allows the nozzles 195 to be brought closer to the surface of the dense bed and at the same time shields the nozzles from contact with granular ice which might be projected upwards from the bed. Furthermore, granular ice projected upward above the surface of the dense bed passes up and down through the spray rapidly and therefore does not remain in the path of water mist sprays sufficient time to receive an excessive deposit of mist.

Fig. 9 illustrates another form of the invention. Chamber 250 contains a densely fluidized bed of granular ice 251 passing in a downward direction. Concentric cylinder 252 at the center of chamber 250 contains a second densely fluidized bed of granular ice 253 passing in an upward direction. The density of bed 253 is less than the density of bed 251 because of the higher superficial velocity of gasiform fluid in bed 253 causing a differential static pressure and flow between the said beds.

The granular ice overflows cylinder 252 at upper edge 254, falls into cone-shaped pieces 255, flows out the bottoms of pieces 255 through annular shaped openings 256, and returns to outside the cylinder 252. The rate of circulation of granular ice is controlled either by the size of the openings 256 or by the superficial velocity of the gas passing up through the bed 253.

The bed 253 is cooled by means of tubes 257 containing a vaporizing refrigerant or a liquid coolant such as brine. If brine is employed, it is preferable to have the brine introduced at the upper ends of the tubes 257 from line 258 and header 259 and discharged through header 260 and line 261. This arrangement results in countercurrent heat transfer and provides a higher mean temperature difference between the granular ice and the brine flowing in the tubes.

Water is introduced to the system through line 262, is passed through tubes of cooler 263, is further cooled by passage through tubes 264 of cooler 265 in heat exchange with cold gasiform fluid entering at line 266 and leaving through line 267. The water cooled to near but not below its freezing temperature, flows at a rate set by valves 268 into tubes 269. It is then forced through the spray nozzles at the ends of tubes 270 together with a gasiform fluid causing atomization of the water. It is perferable to employ spray nozzles which produce "hollow-cone" spray patterns in order to direct the water outward at an angle with substantially no water projected straight down.

When the average diameter of the ice granules is 200 microns or greater it is preferable to atomize the water by pressure alone, that is, without the aid of a gasiform fluid. This will avoid the formation of snow from water vapor condensing out of gasiform fluid employed for atomization.

Granular ice flowing through the annular openings 256 in the cones 255 surround the atomizing nozzle tubes 270 projecting through the holes in the cones. Since both the rate of circulation of the granular ice and the flow rate of atomized water are maintained at substantially constant rates, the ratio of the weight of mist to the weight of granular ice is maintained substantially constant. It is preferable that the quantity of water mist is such that the average temperature of the granular ice is 5° F. to 10° F. below the melting point of ice.

Since the granular ice flowing through 256 passes in a direction away from the nozzles after it contacts the water mist, it is practically impossible for wet granular ice to contact the nozzles 270 and freeze to them. Furthermore the ice granules flow through the openings 256 of cones 255 in a dense free-falling condition, when all of the fluidizing gasiform fluid is discharged from the upper part of the chamber 250 through line 271. This arrangement has an advantage in that there is substantially no tendency for the granular ice to close inward in a horizontal direction toward the ends of the nozzles and interfere with the flow of water mist. When line 271 is closed by valve 272 and valve 273 in line 274 is open, the fluidizing gasiform fluid is forced downward through cones 255 and annular openings 256. As a result, the ice granules are separated and are projected at considerable velocity through the annular openings 256. Baffles cover outlet lines 274 to largely prevent ice granules from passing out line 274. This arrangement provides increased dispersion between individual ice granules which increases the uniformity of distribution of water mist on the granular ice.

A size reduction operation is carried out on the granular ice by means of paddle wheel 275 turned at a high rate of rotation by shaft 276 and pulley 277. These small size ice granules are formed from large granules.

The circulation of granular ice in a prescribed path provides more precise and uniform control of the operating conditions such as ratio of the quantity of water to the quantity of granular ice passing through the contact zone and the temperatures of the granular ice and of the water in the contact zone.

Fig. 10 shows one of the cone-shaped pieces 255 of the upper parts of Fig. 9 and a modification involving said pieces. Granular ice 280 passing downward through the holes 256 in cones 255 impinges on conical surface 281 and flows around edge 282 and falls freely in a cylindrical pattern around cylindrical vessel 283 having conical bottom 284 and drain tube 285. Steam is introduced through line 286 at a rate controlled by valve 287 and discharged in spider like header 288. Cold gasiform fluid enters the vessel 283 through line 289 and causes the steam to condense into a fine mist 290. This mist is entrained out the top 291 of vessel 283 and contacts the falling granular ice in area 292.

The advantage of this method of operation is that a much finer mist is obtained than by water atomization which permits more even distribution of the mist on the granular ice and also permits smaller size ice granules to be used without cementing the ice granules together with the water mist. It is known that extremely small drops 1 micron in diameter are formed from condensing water vapor. For example, fog and clouds in the atmosphere are formed from condensing water vapor and they are so small in droplet size that they do not settle.

A considerable quantity of the ice formed will be in the form of snow in this process and it will be desirable to entrain or elutriate such snow from the circulating granular ice. This modification would be applicable where gasiform fluid 289 consists of atmospheric air at winter temperatures such as −10° F. to +20° F.

Fig. 11 shows one of the cone-shaped pieces 255 of Fig. 9 and a further modification involving the said pieces. The water entering vessel 300 through line 301 is atomized by means of gasiform fluid entering through line 302. The superficial gasiform fluid velocity in vessel 300 is such that the largest mist particles settle by gravity down to the bottom 303 and are withdrawn through line 304. The finer mist particles 305 are entrained upward and pass out the top 306 of vessel 300 and contact the granular ice at zone 307.

The principal advantages in settling the atomized water as mentioned is seen from an inspection of Table 4. From this table is seen in one instance that while the average water drop diameter was 61.5 microns, 32.2 weight percent of the mist was 600 microns in diameter. The greater the quantity of the largest size drops that are settled out, the less the cementing together of ice granules that will take place due to incompletely frozen large drops and the higher the permissible temperature of the granular ice entering the freezing zone, and the smaller the permissible diameter of the ice granules which can be maintained in the circulating system.

Fig. 12 shows one of the cone-shaped pieces 255 of Fig. 9 and a still further modification involving the said pieces. Water, entering through line 322 at a constant rate of flow, falls onto the center cone-shaped disc 320, rotated at a high speed such as 3600 to 10,000 R. P. M. by motor 321, and is atomized. The water leaves the disc all around its circumference 323 and impinges on the granular ice at cylindrical zone 324.

The rotating disk has the advantage that the water is finely atomized without the use of gasiform fluid, high pressures, or small orifices. This method of atomization is particularly advantageous because no snow is formed due to the condensation of water vapor from an atomizing gasiform fluid. The mist is directed at the granular ice in a precise manner making it possible to more nearly control the amount of mist each ice granule receives. Aglomerization of a liquid by a rotating disc is also particularly advantageous herein because it produces drops of more uniform diameters than does pressure or gas atomization.

Figure 13:
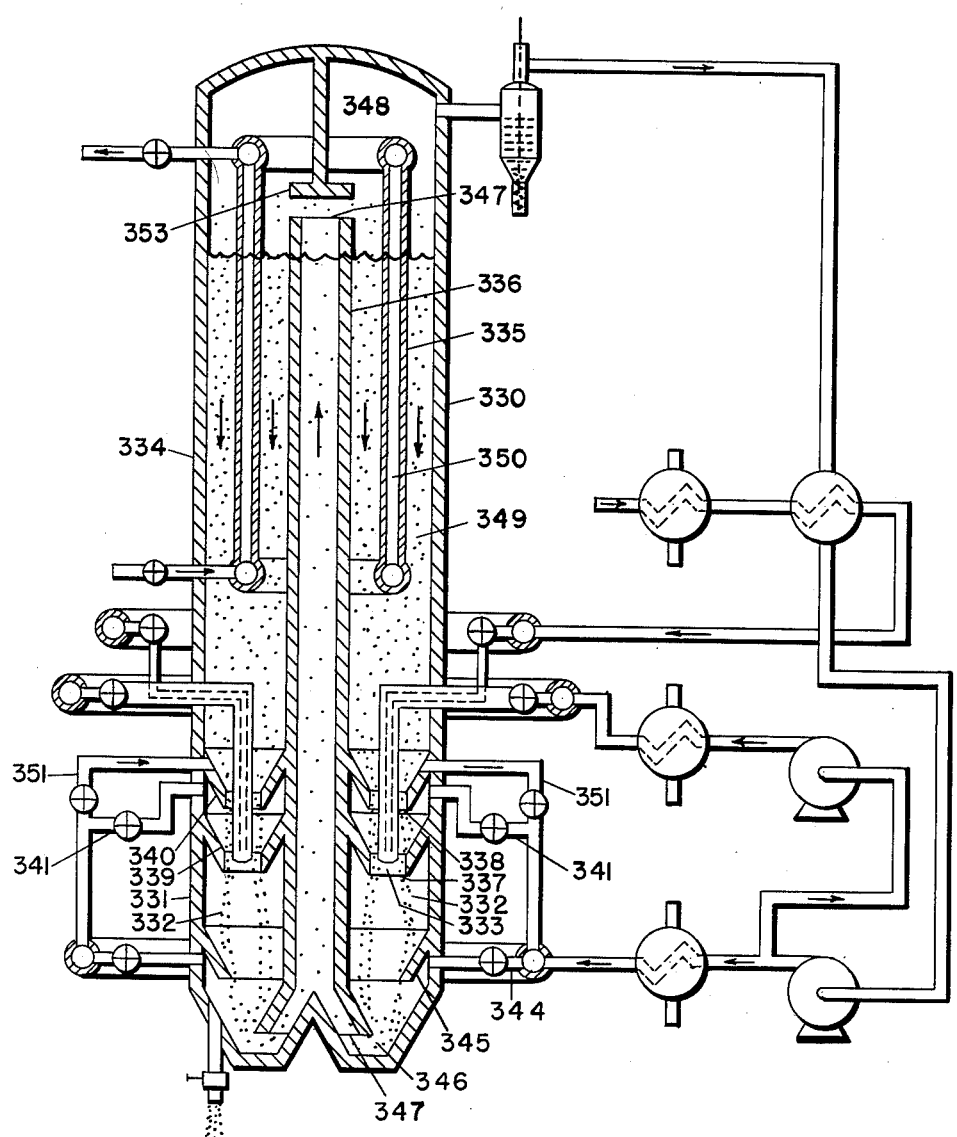
Figure 13 represents another form of the invention which involves the elevation of ice granules in disperse phase from the bottom to the top of a freezing chamber.

Fig. 13 represents another form of the invention. Vessel 330 contains lower section 331 wherein the granular ice 332 is contacted with mist 333, upper section 334 consisting of a dense bed of fluidized granular ice which is cooled by tubes 335, and central section 336 through which the granular ice is elevated in disperse phase.

The granular ice flows down through annular spaces 337 and 338 of multiple cones 339 and multiple cones 340. Gasiform fluid entering at line 341 passes through the annular spaces 337 of cones 339 along with the granular ice. Mist 333 from the end of tubes 343 contacts the granular ice surrounding tubes 343. At times it is desirable for the granular ice 332 to fall freely in compact form, in which case the fluidizing gasiform fluid enters through lines 344 behind baffle 345. The annular space 346 underneath the edge 347 of cylinder 336 is restricted so that the superficial gasiform fluid velocity is at 20 to 50 ft./sec. which is sufficiently high to convey the ice granules in disperse phase into the tube 336. This avoids plugging of space 346 with granular ice.

The granular ice is conveyed in disperse phase at velocities of 10 to 200 ft./sec. up tube 336 and out the top 347 of the cylinder 336. The granular ice is separated from the gasiform fluid in disengaging space 348 and passes downward in annular section 349 where it is cooled by tubes 335 containing coolant 350. Cooled gasiform fluid is injected in multiple lines 351 to fluidize the granular ice in section 349 and increase the heat transfer rate between the granular ice in 349 and tubes 335 and also to avoid plugging of section 352 with granular ice.

A disc 353 is mounted over the top of cylinder 336 in the path of the granular ice passing upwards at high velocity. As a result of the impact, the granular ice is fractured into smaller pieces.

The elevation of the granular ice in disperse phase permits the use of gasiform fluid at a much lower pressure. As a result a compressor with a lower discharge pressure may be employed. The lower compressor discharge pressure is particularly advantageous because it results in a lower temperature at the compressor discharge as seen from an inspection of Table 2. For example, air taken at atmospheric pressure and 15° F. and compressed to 6 p. s. i. g. has a temperature of 85° F.; while if compressed to 2 p. s. i. g., it has a temperature of 33° F. Therefore, at 2 p. s. i. g. little or no cooling of the compressed air would be required to avoid melting ice.

In this modification large volumes of gasiform fluid are required and practically unlimited amounts of said gasiform fluid can be employed. The greater the volume of gasiform fluid the lower will be the concentration of the granular ice in the disperse phase. Large volumes of gasiform fluid are particularly advantageous because the sensible heat capacity of the gasiform fluid is sufficient to permit refrigerating the granular ice by cooling the gasiform fluid below the lowest required temperature of the granular ice. For example, atmospheric air could be passed through the equipment when it is at a temperature substantially below the freezing point of water as in the winter.

Figure 14:
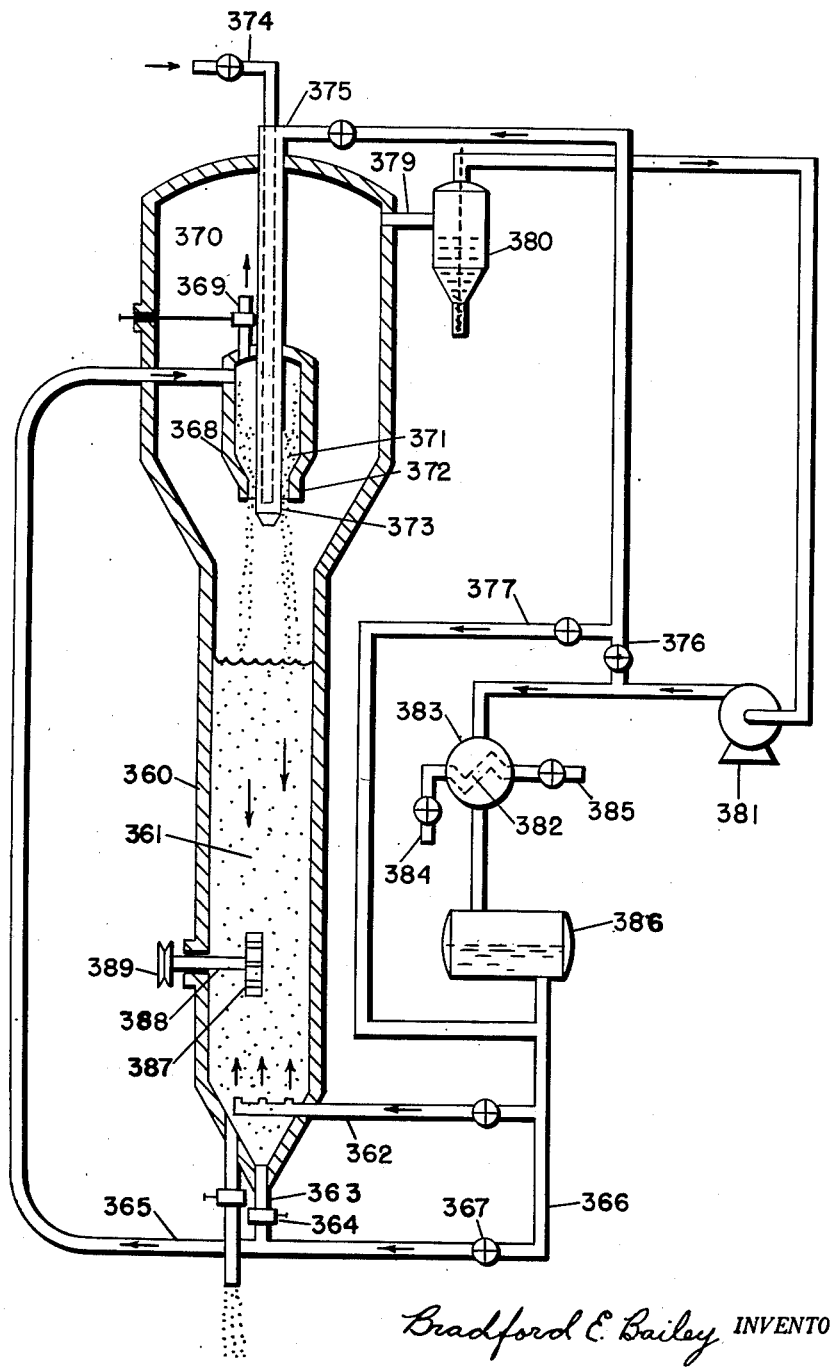
Figure 14 represents another form of the invention which involves the cooling of ice granules by direct contact with a vaporizing refrigerant.

Fig. 14 is another form of the invention. The vessel 360 contains ice granules 361 maintained in a fluidized state by means of gasiform fluid produced in the vaporization of a liquid such as propane entering at line 362, the vaporization of the liquid also cooling the granular ice.

The dense fluidized bed of granular ice 360 acts as a "standpipe" to develop sufficient static head to force granular ice into line 363 and through slide valve 364. In line 365 the granular ice contacts a vaporizing liquid such as propane entering through line 366 at a rate controlled by valve 367. The heat extracted from the ice granules in line 365 causes the propane to vaporize as described. As a result the granular ice is conveyed in disperse phase (up to 10 lb./cu. ft.) through line 365 and discharged into vessel 368 where the gasiform fluid is separated by centrifugal force and is discharged through line 369 into space 370.

The granular ice 371 then passes downward through the annular opening formed by the hole in the bottom of cone-shaped piece 372 and the spray nozzle tube 373. Water entering the system at 374 is atomized by means of gasiform fluid entering at 375. This gasiform fluid may be taken entirely from line 376 or it may contain propane from liquid propane line 377.

The refrigerant in gaseous form leaves the top of vessel 360 through line 379 and passes through cyclone separator 380 in order to remove any entrained snow or fine granular ice. The refrigerant gasiform fluid then is raised in pressure by compressor 381; condensed by passage over tubes 382 of cooler 383 and is accumulated temporarily in drum 386. Cooling water enters at 384 and leaves at 385.

A refrigerant which is substantially insoluble in water or ice is employed. In addition, the vaporizing pressure is selected so as to give the cooling temperature desired. For example, at 14.7 p. s. i. a. propane will vaporize at about −44° F. and at 54 p. s. i. a. it will vaporize at +20° F. Any operating conditions in between such limits would be feasible.

This form of the invention has the advantage that a positive method of fluidizing and circulating the ice granules is used.

Large reductions in the cost of refrigeration are possible where the vaporizing refrigerant is contacted directly with the circulating ice granules due to the most efficient heat transfer obtained. Direct contact refrigeration is particularly applicable when combined with my process since the ice is simultaneously cooled, fluidized and circulated by means of the gasiform fluid produced from the refrigerant. Only one set of compressors is required instead of two resulting in further overall compressor cost reduction.

Figure 15:
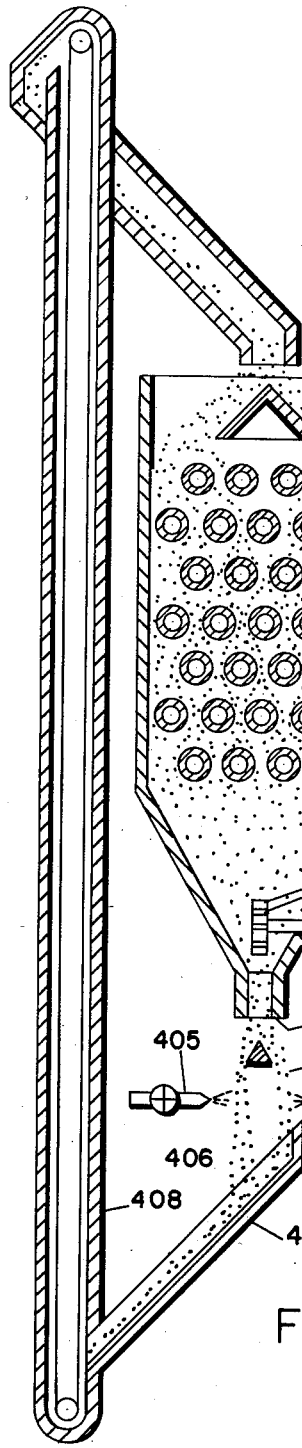
Figure 15 represents another form of the invention which involves the cooling of ice granules by passing the granules downward over cooling tubes.

Fig. 15 illustrates another form of the invention. Vessel 400 contains tubes 401 through which a coolant 402 is passed. Granular ice 403 flowing through a long narrow opening 404 in the bottom of vessel 400 are contacted with water mist discharging from rows of flat spray nozzles 405 on opposite sides of the stream of granular ice 403. The granular ice 406 then falls into the inlet 407 of bucket conveyor 408 and is conveyed to the top of vessel 400. The granular ice then passes down over the tubes 401 by which it is cooled to some temperature substantially below the melting point of ice.

This process is particularly applicable where it is desired to produce a liquid which contains a suspended solid and for that reason is difficult to fluidize when frozen. For example, fruit juices containing particles of pulp would preferably be frozen by this process. In this example, it would be difficult to atomize the fruit juice into very fine mist and there it would be necessary to employ circulating granular ice of large diameters of say, 2000 to 15,000 microns. With such large size granules it will be preferable to flow the granules over the cooling tubes by gravity in order to avoid plugging and stoppage of the circulation.

Since this modification is generally used where the granules and the liquid spray are comparatively large in diameter, atomization without the aid of a gasiform fluid will be preferable and the production of snow type of frozen material will be minimized. However, in this type of apparatus, snow would not interfere appreciably with circulation.

Figure 16:
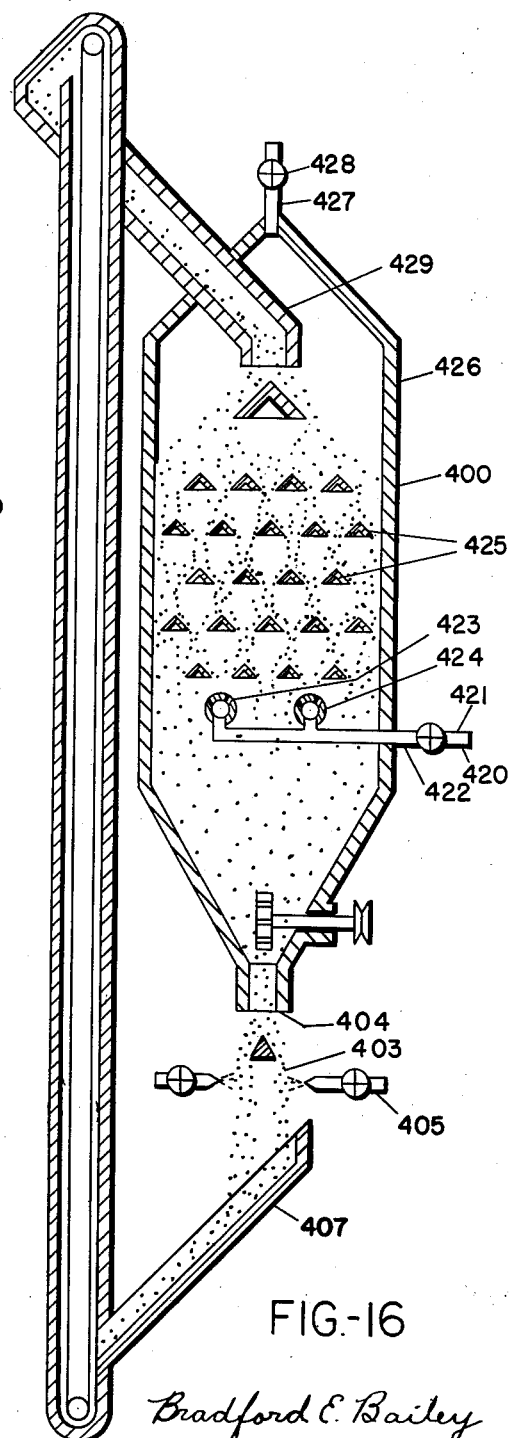
Figure 16 represents the cooling chamber of Figure 15 and a modification thereto which involves the use of baffles and direct contact cooling instead of cooling by means of tubes.

Fig. 16 shows the cooling vessel 400 of Fig. 15 and a modification concerning the method of supplying refrigeration to the granular ice. A volatile liquid refrigerant is introduced through line 420, valve 421, line 422, and ring shaped headers 423 and 424, from which it is discharged in a number of small holes. Granular ice 429 entering the top 426 over vessel 400 flows by gravity downward over baffles 425.

The volatile refrigerant is vaporized as it comes into direct contact with the granular ice flowing past the headers 423 and 424 and at the same time cools the granular ice.

The gasiform fluid produced from the vaporization of the refrigerant leaves through line 427 and valve 428. The liquid refrigerant enters the upper section of vessel 400 so that it can flow downward as a liquid until it is vaporized. It is important that all of the refrigerant be vaporized before it reaches the lowest set of baffles.

This method of employing direct contact refrigeration has an advantage over the prior art wherein direct contact refrigeration is employed to produce ice as in U. S. Patents 1,755,810 and 1,976,204. In my invention the water is contacted with the cold granular ice in a zone which is separated from the zone in which the refrigerant is present. This arrangement eliminates the ice-hydrocarbon hydrates which form when water is frozen in the presence of hydrocarbons refrigerants such as butane. A more pure ice is therefore obtained.

Direct contact of a volatile refrigerant for cooling ice granules having average diameters of 2,000 to 15,000 microns is particularly advantageous over other methods involving cooling surfaces and tubes because the heat transfer coefficient between tubes and fluidized solids decrease as particle size increases, in general.

Figs. 1 to 16 are further described by reference to Table 7 which shows operating conditions for plants producing 100 tons per day of granular ice. Five different examples are shown which employ ice granules of 100 and 1000 microns in size, water droplets of 5 and 50 microns in size, and granular ice temperatures from −25° F. to +25° F. It is pointed out that other conditions could be employed.

Table 7 is set up on the basis of showing operating conditions existing particularly in the freezing zones of the various methods when a certain weight of water mist is brought into contact with a certain weight of granular ice. In Figs. 9 to 16, where granular ice is actually circulated, such an analysis is directly applicable. In Figs. 1 to 8, which involve contacting water mist with bed of granular ice in an ebulliently fluidized dense phase condition, it is considered that ice granules are intermixing throughout the said bed. Thus, ice granules may be thought of as "passing through the freezing zone" as in item 11 of the Table 7 at a certain rate.

The great advantages of my invention are clearly brought out by means of Table 7. For example, heat transfer rates (item 17) between the granular ice and water are tremendous, being in the range of $3 \times 10^9$ to $4.25 \times 10^{14}$ B. t. u./hr./sq. ft. of ice surface. The surface of ice in the freezing zone (item 11) is between $1.65 \times 10^7$ and $1.87 \times 10^8$ sq. ft./hr. As a result, the time required to freeze a drop of water is extremely short, in the range of $1.23 \times 10^{-5}$ to $1.6 \times 10^{-3}$ seconds.

In Example No. 1 the average diameter of the ice granules is 100 microns and of the water drops is 5 microns. The granular ice enters the freezing zone at 20° F. and leaves at 25° F., which requires that 530,000 lbs./hr. of granular ice be circulated through the freezing zone.

Good distribution of the water between individual ice granules and good distribution of the water on any one ice granule is obtained since 117 drops of water will be deposited on each ice granule. Based on the assumption that the 5 micron water drops will flatten out to 2 microns in thickness when they strike an ice granule, 20,000,000 sq. ft./hr. will be covered by water or 12% of the surface of granular ice passing through the freezing zone.

The time to freeze a water drop on an ice granule is only $6.1 \times 10^{-5}$ or 0.000061 second based on the above conditions. If an ice granule were traveling at a rate of 1 ft./sec., the granule would travel only 1.5 microns, or 2.6% of the diameter of the granule in the time required to freeze the water drop. In a bed of fluidized granular ice where the density of an ice granule is about 60 lbs./cu. ft. and the bed density is 20 lbs./cu. ft., the average space between granules will be much more than 1.5 microns. Thus there will be little tendency for ice granules to be cemented together by freezing.

Example No. 2 varies from Example No. 1 in that the granular ice enters the freezing zone at −25° F. and leaves at −20° F. The distance traveled by the ice granules while the water is freezing is reduced to 0.28 micron.

In Example No. 3 the coarser water mist of 50 microns diameter is employed and the ice granules are 100 microns. With this ratio of ice granule size to water drop size, it is found necessary to employ a greater temperature rise of the granular ice in the freezing zone. With the ice entering the freezing zone at −25° F. and leaving at +25° F., there will be an average of 1.17 drops of water for each ice granule passing through the freezing zone. Assuming that the 50 micron water drops flatten out to 10 microns on impact with the ice, 4,000,000 sq. ft./hr. of granular ice surface will be covered by the water, or 24% of the surface of the granular ice passing through the freezing zone. The ice granules will travel about 11.5 microns while the water drop is freezing. The ratio of ice granule diameter to water drop diameter should be preferably greater than the 2 to 1 employed herein, in order to give more water drops per ice granule. If ratios of ice granule to water drop diameters of less than 2 to 1 are used, considerable cementing together will occur necessitating large agglomerates be fractured into smaller granules by means of a grinder.

In Example No. 4 the diameter of the ice granules is 1000 microns and of the water drops is 50 microns, giving the same 10 to 1 ratio of diameters employed in Example No. 1. The granular ice enters the freezing zone at 20° F. and leaves at 25° F., the same as in Example No. 1. The ice granules travel 39 microns, or 4% of the ice granular diameter in the time required to freeze the water drops.

In Example No. 5 relatively large ice granules of 1000 microns in size and finely atomized water with drop diameters of 5 microns are employed. The temperature of the granular ice is maintained at −25° F. to −22.5° F. It is found that the ice granules freeze in the time they travel 0.30 micron or 0.03% of the diameter of the ice granule.

Specific diameters of the ice granules and of the water drops are used for illustration purposes in Table 7. In actual practice, however, the ice granules and the water drops will have a range of diameters. In order to deposit additional ice without freezing an excessive quantity of granules together, it will be necessary to base the operating conditions on the ice granules having substantially the smallest diameters and on the water drops having substantially the largest diameters. On the other hand, it is generally desirable to produce small ice granules to serve as nucleuses by grinding and a small amount of freezing together of ice granules is not objectionable.

Although I have described my invention with a certain degree of particularity, it is understood that the present disclosure has been made only by way of example and that numerous modifications may be made by those skilled in the art without departing from the spirit thereof.

TABLE 7

*Operating conditions for producing 100 tons per day of granular ice*

| | Example No. 1 | Example No. 2 | Example No. 3 | Example No. 4 | Example No. 5 |
|---|---|---|---|---|---|
| 1. Diameter of ice granules, microns | 100 | 100 | 100 | 1,000 | 1,000 |
| 2. Diameter of water drops, microns | 5 | 5 | 50 | 50 | 5 |
| 3. Ice produced: | | | | | |
| tons/day | 100 | 100 | 100 | 100 | 100 |
| lbs./hr | 8,340 | 8,340 | 8,340 | 8,340 | 8,340 |
| 4. Water feed temperature, °F | 40 | 40 | 40 | 40 | 40 |
| 5. Temperature of ice withdrawn, °F | 25 | −25 | 25 | 25 | −25 |
| 6. Refrigeration required: | | | | | |
| tons/day | 108 | 122.5 | 108 | 108 | 122.5 |
| B. T. u./hr | $1.29 \times 10^6$ | $1.47 \times 10^6$ | $1.29 \times 10^6$ | $1.29 \times 10^6$ | $1.47 \times 10^6$ |
| 7. Temperature of ice before contact with water drops, °F | 20 | −25 | −25 | 20 | −25 |
| 8. Temperature of ice immediately after water drops are frozen, °F | 25 | −20 | 25 | 25 | −22.5 |
| 9. Quantity of ice passing through the freezing zone, lbs./hr | $5.30 \times 10^5$ | $6.03 \times 10^5$ | $5.3 \times 10^4$ | $5.3 \times 10^5$ | $1.20 \times 10^6$ |
| 10. Ratio: $\frac{\text{Number of water drops}}{\text{Number of ice granules}}$ | 117 | 103 | 1.17 | 117 | $5.15 \times 10^4$ |
| 11. Surface area of ice granules passing through the freezing zone, sq. ft./hr | $1.65 \times 10^8$ | $1.87 \times 10^8$ | $1.65 \times 10^7$ | $1.65 \times 10^7$ | $3.74 \times 10^7$ |
| 12. Thickness of water layer on ice granules, assumed, microns | 2 | 2 | 10 | 10 | 2 |
| 13. Surface area of water layer deposited on the ice granules, sq. ft./hr | $2.0 \times 10^7$ | $2.0 \times 10^7$ | $4.0 \times 10^6$ | $4.0 \times 10^6$ | $2.0 \times 10^6$ |
| 14. Portions of ice granule surface area covered by water layer, percent | 12.1 | 10.7 | 24 | 24 | 53 |
| 15. Temperature difference between ice granule and water layer: | | | | | |
| a. At start of freezing, °F | *12 | *57 | *57 | *12 | *57.5 |
| b. At end of freezing, °F | 7 | 52 | 7 | 7 | 54.5 |
| c. Average, °F | 9.5 | 54.5 | 32 | 9.5 | 56.0 |
| 16. Heat transfer coefficient B. t. u./hr./sq. ft (=k/l)** | $3.90 \times 10^5$ | $3.90 \times 10^5$ | $7.8 \times 10^4$ | $7.8 \times 10^4$ | $3.90 \times 10^5$ |
| 17. Rate of heat transfer during freezing of water drop=Item (15c) (Item 16) (Item 13), B. t. u./hr | $7.4 \times 10^{13}$ | $4.25 \times 10^{14}$ | $1.00 \times 10^{11}$ | $3 \times 10^9$ | $4.35 \times 10^{14}$ |
| 18. Time to freeze water drop=$\frac{\text{Item 6}}{\text{Item 17}} \times 3{,}600$, seconds | $6.1 \times 10^{-5}$ | $1.1 \times 10^{-5}$ | $4.6 \times 10^{-4}$ | $1.6 \times 10^{-3}$ | $1.23 \times 10^{-5}$ |
| 19. Velocity of ice granules (assumed), ft./sec | 1 | 1 | 1 | 1 | 1 |
| 20. Distance traveled by ice granule during period required to freeze water drop, microns | 1.5 | 0.28 | 11.5 | 39 | 0.30 |

NOTES:
*The temperature differences at the start of the freezing corresponds to the water being at 32° F. Actually, the temperature difference is higher when the water is being cooled from 40° F down to 32° F.
**k=the thermal conductivity of ice.
=1.3 B. t. u./(hr.)/(sq. ft.) (° F. per ft.).
¹ =average thickness of ice through which heat is conducted from the water. It is taken as equal to one-half of the thickness of the new layer of ice being frozen (1 micron in Examples 1, 2, and 5 and 5 microns in Examples 3 and 4).

What I claim is:

1. Process of producing frozen-liquid in substantially granular form, comprising, maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen liquid by supplying refrigeration to said bed, discharging the gasiform fluid from said chamber and from above said bed and recycling said gasiform fluid back to said bed as a fluidizing fluid, maintaining the temperature of said fluidized bed of frozen-liquid sufficiently low that the recycled gasiform fluid is maintained below the melting point of ice, supplying all of the refrigeration required by means of chilled surface in intimate contact with said fluidized bed, bringing the liquid-to-be-frozen in atomized form into intimate contact with granular solids of said fluidized bed, thereby producing an additional amount of frozen liquid substantially in granular form.

2. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen-liquid, supplying substantially all of the refrigeration required to produce the said frozen-liquid by bringing the said previously frozen mass of frozen-liquid while in said bed into intimate contact with refrigerated surfaces, and bringing the liquid-to-be-frozen in atomized form into intimate contact with the granular frozen-liquid in said fluidized bed, thereby producing an additional amount of frozen-liquid substantially in granular form.

3. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen-liquid, supplying substantially all of the refrigeration required to freeze the liquid-to-be-frozen by bringing the said previously frozen mass of frozen-liquid into intimate contact with refrigerated surfaces, bringing the liquid-to-be-frozen in atomized form into intimate contact with the granular solids of said fluidized bed thereby producing an adidtional amount of frozen-liquid substantially in granular form, continuously withdrawing a portion of the frozen-liquid produced, crushing said withdrawn frozen-liquid to suitable size, and recycling said crushed frozen-liquid to said bed.

4. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen-liquid, supplying substantially all of the refrigeration required to freeze the liquid-to-be-frozen by bringing the said previously frozen mass of frozen-liquid into intimate contact with refrigerated surfaces, and bringing the liquid-to-be-frozen in atomized form into intimate contact with the granular solids in the bottom portion of said fluidized bed, thereby producing an additional amount of frozen-liquid substantially in granular form.

5. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen-liquid, supplying substantially all of the refrigeration required to freeze the liquid-to-be-frozen by bringing the said previously frozen mass of frozen-liquid into intimate contact with refrigerated surfaces, and introducing the liquid-to-be-frozen in atomized form upwardly into intimate contact with the granular frozen-liquid in at least one zone of the bottom portion of said fluidized bed, maintaining an upward movement of the frozen-liquid in the immediate vicinity of the said zones where the liquid-to-be-frozen is introduced, thereby producing an additional quantity of frozen-liquid in substantially granular form.

6. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen-liquid, supplying substantially all of the refrigeration required to freeze the liquid-to-be-frozen by bringing the said previously frozen mass of frozen-liquid into intimate contact with refrigerated surfaces, bringing the liquid-to-be-frozen in atomized form into intimate contact with the granular solids in the bottom portion of said fluidized bed, and introducing the major portion of the said fluidizing fluid in close proximity to where the liquid-to-be-frozen in introduced the velocity of the said major portion of the fluidizing fluid being considerably greater than the average superficial velocity of the fluidizing fluid emerging from the upper surface of the said bed.

7. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said gasiform fluid entering said freezing chamber below the melting point of said frozen-liquid, maintaining the temperature of said bed below the melting point of said granular frozen-liquid, supplying substantially all of the refrigeration required to freeze the liquid-to-be-frozen by bringing the said previously frozen mass of frozen-liquid into intimate contact with refrigerated surfaces, and bringing the liquid-to-be-frozen in atomized form into intimate contact with the chilled granular frozen-liquid in the said fluidized bed thereby producing an additional amount of frozen-liquid substantially in granular form.

8. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen-liquid, supplying substantially all of the refrigeration required to freeze the liquid-to-be-frozen by bringing the said previously frozen mass of frozen-liquid into intimate contact with refrigerated surfaces, bringing the liquid-to-be-frozen in atomized form into intimate contact with a portion of the upper surface of said bed, maintaining the superficial velocity of the fluidizing gasiform fluid within said portion of upper surface considerably greater than the average superficial fluidizing velocity of the bed surface by introducing aditional amounts of gasiform fluid immediately beneath said portion of upper surface, thereby producing an additional amount of frozen-liquid substantially in granular form.

9. Process of producing frozen-liquid in substantially granular form, comprising maintaining a previously frozen mass of said granular frozen-liquid as a turbulent densely fluidized bed confined in a freezing chamber by passing a cold gasiform fluid upwardly through said bed at suitable fluidizing velocities, maintaining the temperature of said bed below the melting point of said granular frozen-liquid, supplying substantially all of the refrigeration required to freeze the liquid-to-be-frozen by bringing the said previously frozen mass of frozen-liquid into intimate contact with refrigerated surfaces, and bringing the liquid-to-be-frozen in atomized form into intimate contact with the granular solids in the upper surface portion of the said fluidized bed, thereby producing an additional amount of frozen-liquid substantially in granular form.

10. Process of producing frozen-liquid in substantially granular form, comprising maintaining granular frozen-liquid in a turbulent condition, maintaining the temperature of said granular frozen-liquid below the melting point of said granular frozen-liquid, supplying substantially all of the refrigeration required to freeze the liquid-to-be-frozen by bringing the said frozen-liquid into intimate contact with refrigerated surfaces, and bringing the liquid-to-be-frozen in atomized form into intimate contact with the refrigerated granular frozen-liquid, thereby producing an additional amount of frozen-liquid substantially in granular form.

11. A process of producing frozen-liquid in substantially granular form, comprising maintaining granular frozen-liquid in a turbulent condition, maintaining the temperature of said granular frozen-liquid below the melting point of said granular frozen-liquid, supplying substantially all of the refrigeration required to freeze the liquid-to-be-frozen by bringing the said frozen-liquid into intimate contact with refrigerated surfaces, circulating the granular frozen-liquid over a prescribed path, and bringing the liquid-to-be-frozen into intimate contact with said circulating granular frozen-liquid, thereby producing an additional amount of frozen-liquid substantially in granular form.

References Cited in the file of this patent

UNITED STATES PATENTS

| | | |
|---|---|---|
| 1,104,920 | Osborne | July 28, 1914 |
| 1,221,054 | Hyatt | Apr. 3, 1917 |
| 1,478,863 | Stewart | Dec. 25, 1923 |
| 1,966,150 | Tamm | July 10, 1934 |
| 2,009,283 | Warner | July 23, 1935 |

FOREIGN PATENTS

| | | |
|---|---|---|
| 58,294 | Netherlands | Sept. 16, 1946 |
| 557,344 | Germany | Aug. 22, 1932 |